United States Patent
Satoh

[19]

[11] Patent Number: 5,920,540
[45] Date of Patent: Jul. 6, 1999

[54] OPTICAL DISK HAVING ADDRESS INFORMATION IN LANDS AND GROOVES, AND AN INFORMATION RECORDING/REPRODUCTION METHOD

[75] Inventor: Isao Satoh, Neyagawa, Japan

[73] Assignee: Matsushita Electric Industrial Co., Ltd., Osaka, Japan

[21] Appl. No.: 08/795,871

[22] Filed: Feb. 6, 1997

Related U.S. Application Data

[62] Division of application No. 08/255,648, Jun. 8, 1994, Pat. No. 5,648,954.

[30] Foreign Application Priority Data

Jun. 8, 1993 [JP] Japan .................................. 5-137089
Jun. 10, 1993 [JP] Japan .................................. 5-138793

[51] Int. Cl.⁶ ........................................................ G11B 7/24
[52] U.S. Cl. .................................. 369/275.1; 369/275.3; 369/44.26
[58] Field of Search ........................ 369/275.1, 275.2, 369/275.3, 275.4, 54, 32, 64, 59, 116, 49, 277, 109, 110, 44.26, 44.28, 44.11, 44.29, 44.37, 13, 58

[56] References Cited

U.S. PATENT DOCUMENTS 4,523,304  6/1985  Satoh et al. ............................... 369/32
4,866,692  9/1989  Saito et al. ................................ 369/59
4,949,325  8/1990  Tsuyoshi ................................... 369/49
4,949,326  8/1990  Takagi et al. ............................. 369/54
5,077,720  12/1991 Takagi et al. ............................. 369/59
5,185,730  2/1993  Komaki et al. ....................... 369/44.26
5,199,022  3/1993  Suzuki et al. ........................ 369/275.1
5,383,176  1/1995  Inui et al. ............................ 369/275.4
5,414,652  5/1995  Mieda et al. ........................... 365/122
5,414,689  5/1995  Maeda et al. ........................... 369/116
5,448,552  9/1995  Onagi .................................. 369/275.4
5,493,552  2/1996  Kobori .................................. 369/109
5,499,229  3/1996  Murakami et al. ...................... 369/111
5,648,954  7/1997  Satoh .................................. 369/275.1

FOREIGN PATENT DOCUMENTS 55-128979  10/1980  Japan .
57-103143  6/1982   Japan .
61-042738  3/1986   Japan .
01053361   3/1989   Japan .
01286154   11/1989  Japan .
02247825   10/1990  Japan .

*Primary Examiner*—Ali Neyzari
*Attorney, Agent, or Firm*—Ratner & Prestia

[57] ABSTRACT

In an optical disk having a recording plane having a spiral first track and a spiral second track, information being to be recorded into and/or reproduced from said first and second tracks, the first track is formed into a groove-like shape, the second track is formed between adjacent the first tracks and into a land-like shape, and the first and second tracks record informations in different modulation methods.

12 Claims, 17 Drawing Sheets

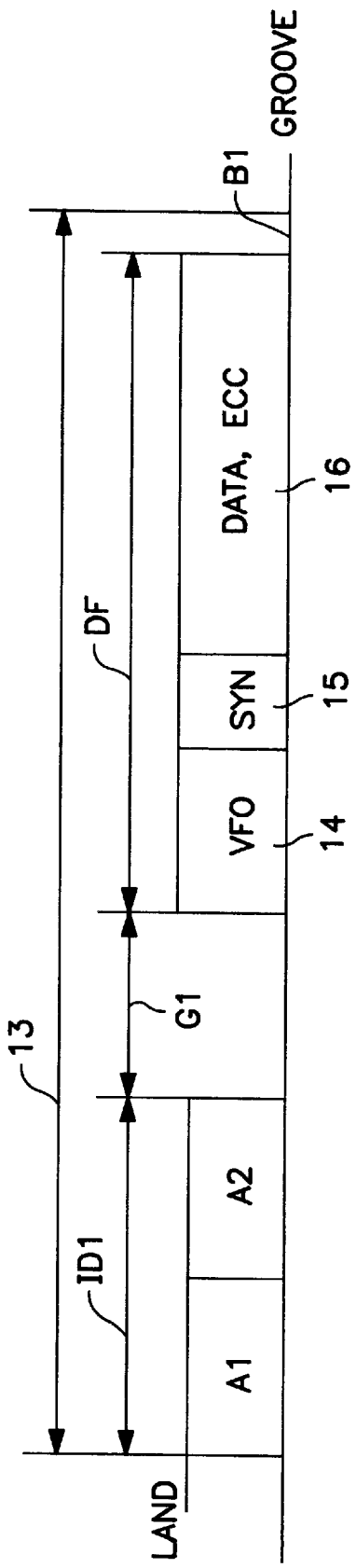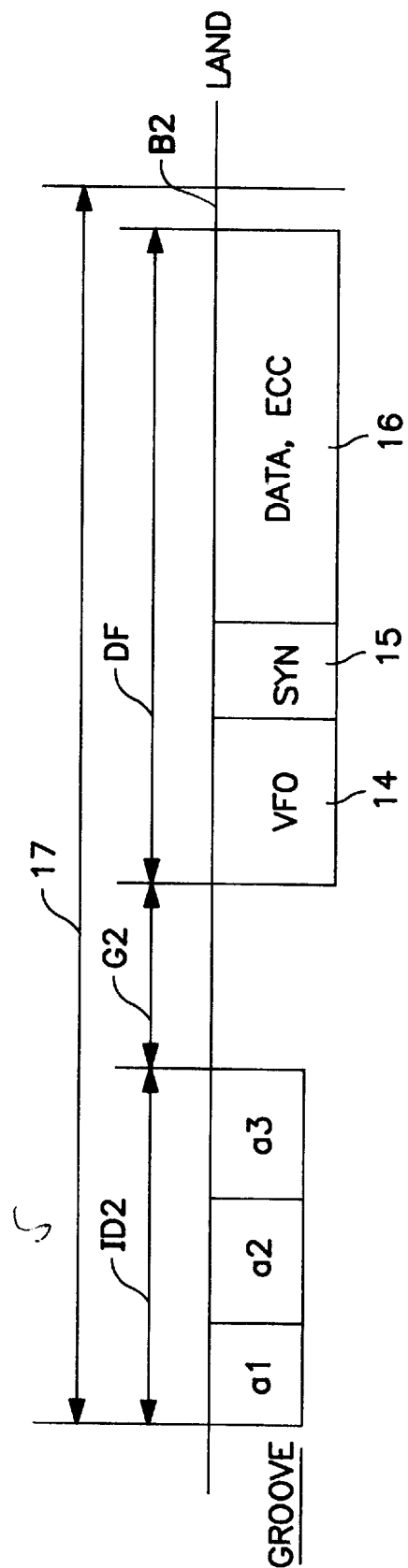

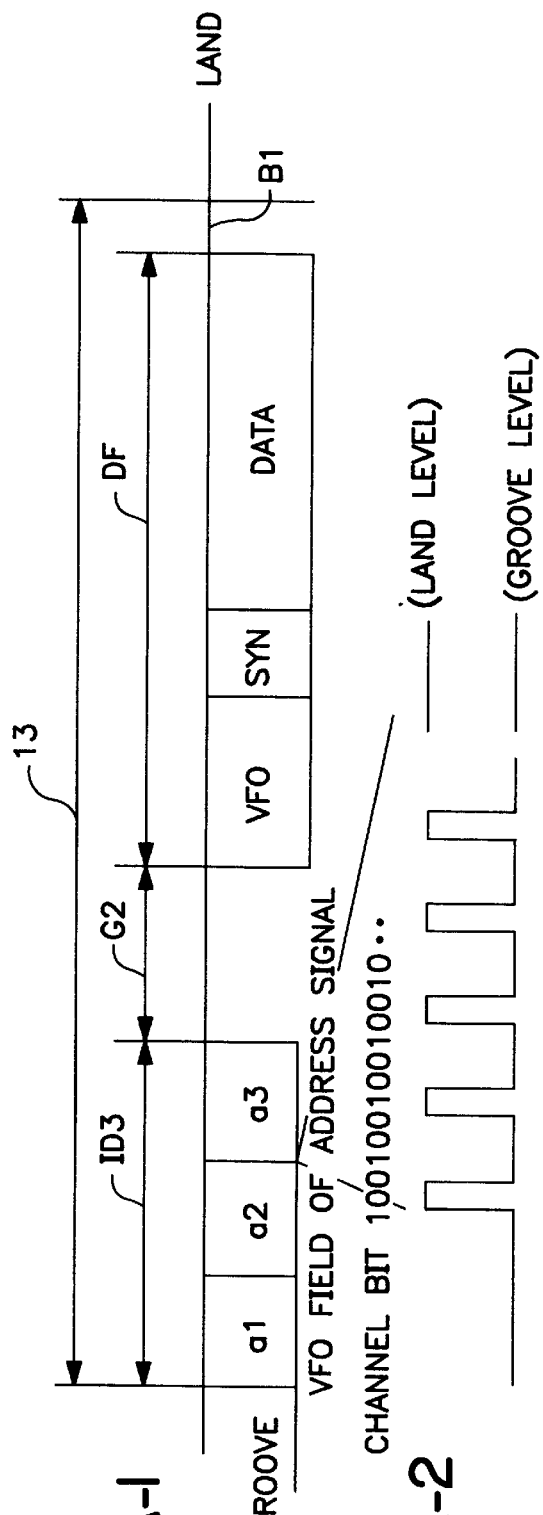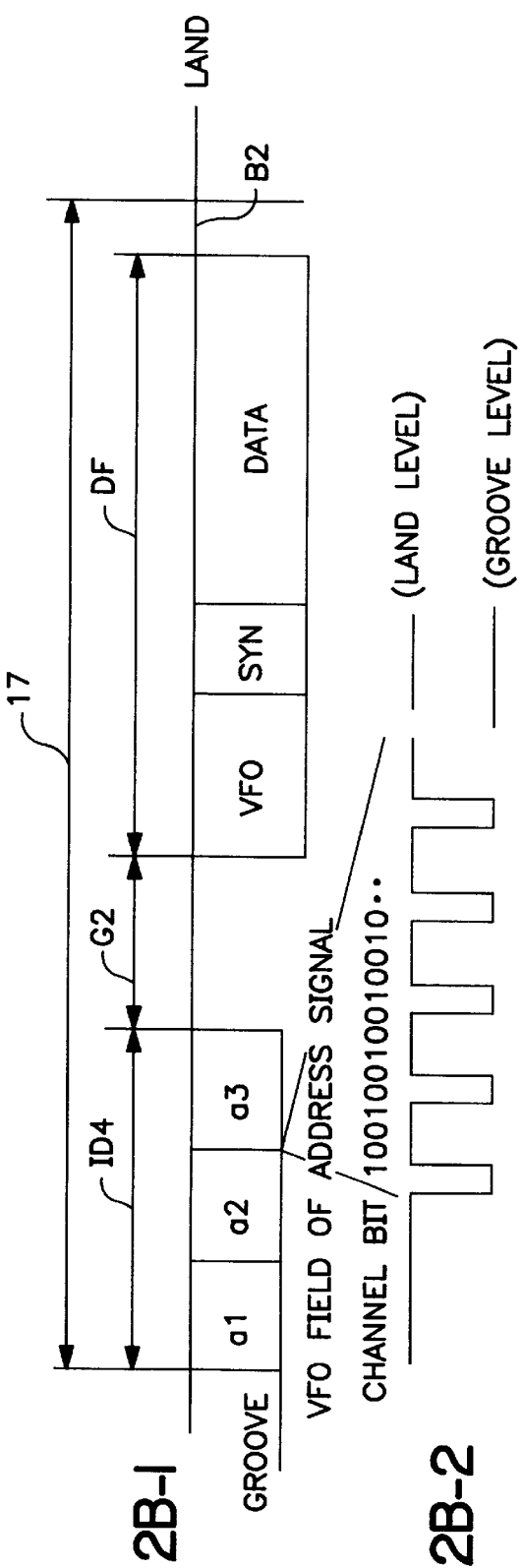

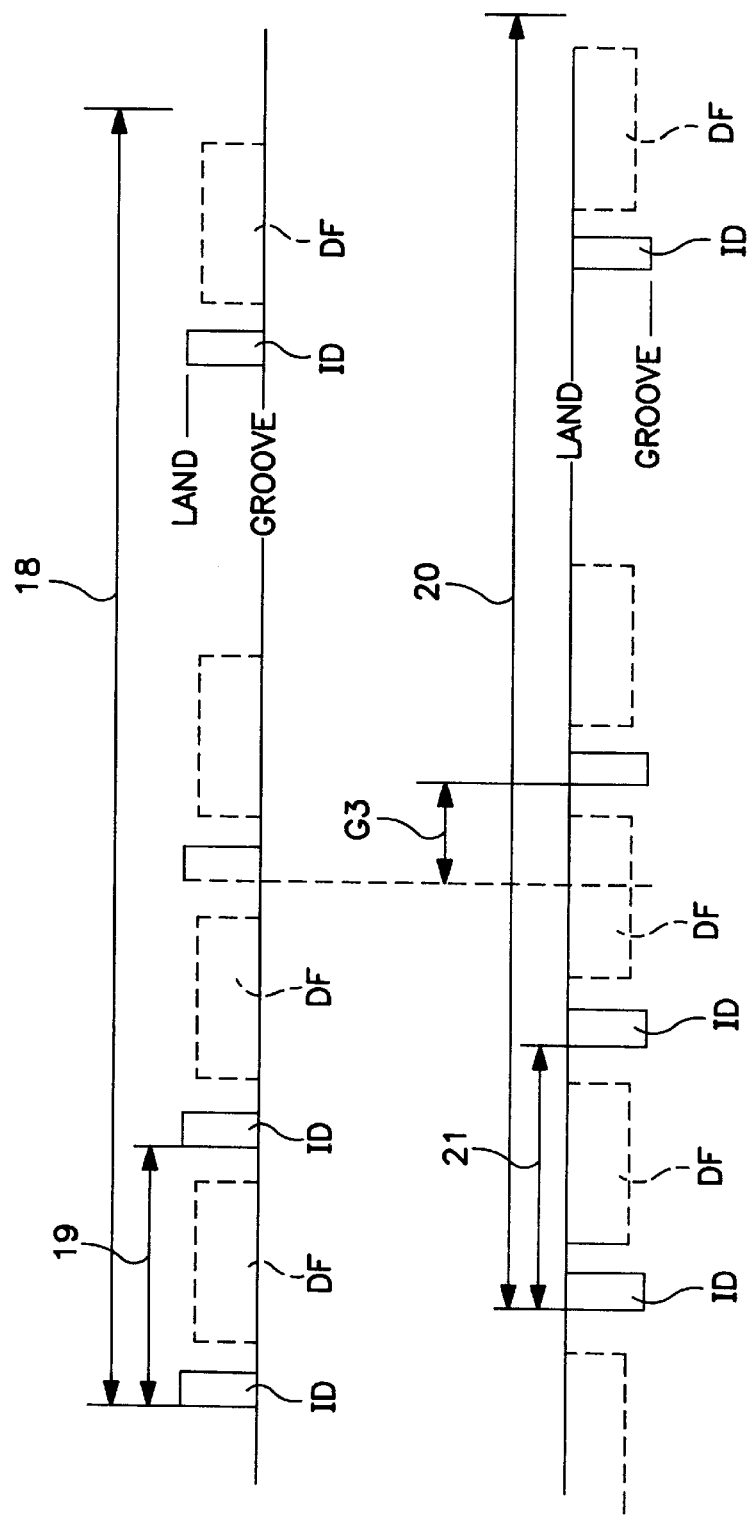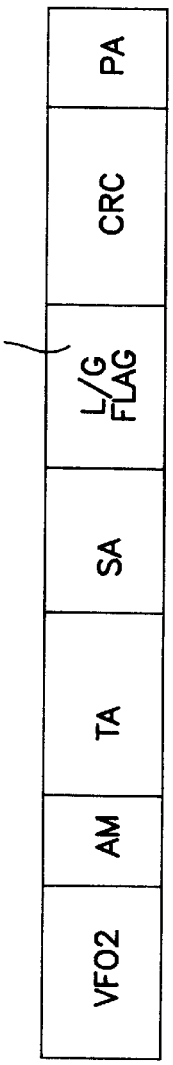

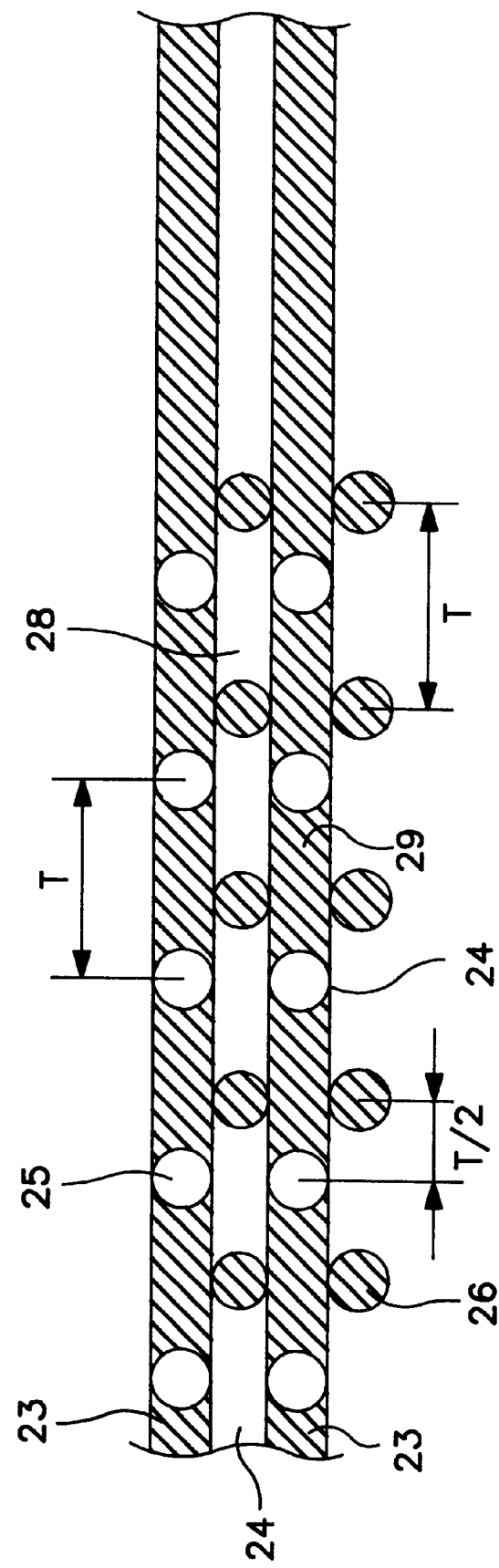

p : TRACK SELECTION SIGNAL
g : TRACK IDENTIFICATION SIGNAL

& nbsp;
OPTICAL DISK HAVING ADDRESS INFORMATION IN LANDS AND GROOVES, AND AN INFORMATION RECORDING/REPRODUCTION METHOD This application is a division of application Ser. No. 08/255,648, filed Jun. 8, 1994, now U.S. Pat. No. 5,648,954.

BACKGROUND OF THE INVENTION

1. Field of the Invention

The invention relates to a high density optical disk on which recording and reproduction of information are conducted with respect to a land and a groove of a track, and also to an information recording/reproduction apparatus which conducts recording and reproduction of information on the optical disk.

2. Description of the Prior Art

An optical disk is a high density memory which has a large capacity, on which non-contact recording and reproduction can be conducted, and which can be replaced with another one. Capacities of typical optical disks are as follows: When an optical head of a lens NA of 0.5 is used, a 130-mm disk has a capacity of 300 to 500 MB per face, and a 90-mm disk has a capacity of about 128 to 250 MB per face. For a multimedia purpose, a high density recording/reproduction technique which uses a short-wavelength laser of 680 nm to obtain a capacity that is about 2 to 4 times the above-mentioned capacities has been studied.

FIGS. 10(a), 10(b) and 10(c) show plan views (upper ones) and section views (lower ones) of continuous servo track formats in the prior art.

FIG. 10(a) shows a continuous servo track which is employed in a 130-mm or 90-mm optical disk of the prior art and which is of a land record track format. In the land record track format, a track consists of a groove 2 which is formed on a transparent substrate 1 and which has a depth of $\lambda/(8 \cdot n)$ ($\lambda$ is the wavelength of a laser, and n is the refractive index of the substrate 1. The same applies to the followings.), and pits 4 constituting a sector identification (ID) signal, and record marks 5 are recorded onto a land 3 sandwiched by the tracks. The pits 4 for the ID signal are convex-concave pits having a phase depth of $\lambda/(4 \cdot n)$.

The track pitch is selected so as to be about $\lambda/NA$ which is obtained from the laser wavelength ($\lambda$) and a lens aperture (NA). In the prior art disk, since the lands must remain to exist between the grooves 2 and the ID signal pits 4, it is difficult to reduce the track pitch to 1.3 $\mu$m or less in the view point of a land forming process.

FIG. 10(b) shows an example of a groove record track format in which tracks are formed by simple grooves 6 having a phase depth of $\lambda/(8 \cdot n)$ and lands 7, and pits 8 constituting an ID signal and record marks 9 wherein data signals are recorded are recorded into the grooves 6. Since such a groove record track has a track structure consisting of the simple grooves 6, a disk of a track pitch which is 1 $\mu$m or less can easily be produced.

FIG. 10(c) shows an example of a land/groove record track format in which groove record tracks are formed by setting the width of grooves 11 having a depth of about $\lambda/(8 \cdot n)$ to be one-half of the track pitch, and signals 12 are recorded also onto lands 10. In principle, this land/groove recording can achieve an area recording density which is twice that of the land recording of FIG. 10(a).

Generally, when a track pitch is to be reduced, there arise problems in a cross-talk of a signal recorded in an adjacent track, in a cross-erase in which also signals into two adjacent tracks are erased by conducting a data recording, and in the stability of a tracking servo.

The stability of a tracking servo will be discussed. In the land record track 10 for the land/groove recording of FIG. 10(c), the track pitch is one-half of $\lambda/NA$. In the case where $\lambda$ is 830 nm and NA is 0.5, even when the pitch of tracks for recording signals is 0.8 $\mu$m, the tracking servo can be conducted with respect to the track pitch of 1.6 $\mu$m consisting of each groove and land. Consequently, the tracking can be done stably by either of the 3-beam method and the push-pull method which are conventionally employed.

Even in the land/groove recording in which recording is conducted as described above, when the track pitch is further reduced in order to increase the recording density, there arises a problem in that a cross-talk between the track of the groove 11 and that of the land 10 occurs.

Specifically, in the case where an optical head in which the laser wavelength $\lambda$ is 830 nm and the lens aperture NA is 0.5 is used, a cross-talk of −30 to −35 dB occurs when the track pitch is 1.6 $\mu$m, and that of −15 to −20 dB occurs when the track pitch is 0.8 $\mu$m, thereby producing a problem in that an ID signal and a data signal cannot be reproduced normally.

Particularly, there arise the following problems: In a track search process, the confirmation of a target track is made difficult by reproduction errors such as that an ID signal is caused to be erroneously reproduced by an effect of a cross-talk on the ID signal, and that an ID signal of an adjacent track is erroneously reproduced. In a recording process conducted on an unrecorded sector, even when an ID signal leaks from an adjacent track, the reproduction is apparently conducted in a normal manner, thereby causing data to be recorded into a wrong sector.

In the groove/land recording conducted as described above, however, the track density is doubled, and hence there arises a problem in that, in a recording or reproducing process, a cross-talk, or a cross-erase produces errors which exceed a criterion, so that defective sectors are generated in an increased number.

SUMMARY OF THE INVENTION

It is an object of the invention to provide an optical disk, and an information recording/reproduction apparatus which can solve the above-discussed problems, increase the recording density as compared with those of the prior art, reduce the level of a cross-talk between tracks of a land and a groove, and prevent an error from being caused to occur in a recording or reproduction of an ID signal or a data signal by a cross-talk between tracks of a land and a groove.

An optical disk of the present invention comprises a recording plane having a spiral first track and a spiral second track, information being to be recorded into and/or reproduced from the first and second tracks, wherein the first track is formed into a groove-like shape, the second track is formed between adjacent the first tracks and into a land-like shape, and the first and second tracks record informations in different modulation methods.

According to the above configuration, in the first track having a spiral and groove-like shape and the second track having a spiral and land-like shape, information is recorded in different modulation methods.

An optical disk of the present invention comprises a recording plane having a spiral first track and a spiral second track, information being to be recorded into and/or reproduced from the first and second tracks, wherein the first track is formed into a groove-like shape, the second track is formed between adjacent the first tracks and into a land-like shape, and the first and second tracks record an address signal in the same modulation method, the address signal of the first track being opposite in polarity to the address signal of the second track.

According to the above configuration, in the first track having a spiral and groove-like shape and the second track having a spiral and land-like shape, address signals are recorded in the same modulation method and in opposite polarities.

An optical disk of the present invention comprises a recording plane having a spiral first track and a spiral second track, information being to be recorded into and/or reproduced from the first and second tracks, wherein the first track is formed into a groove-like shape, the second track is formed between adjacent the first tracks and into a land-like shape, and the first and second tracks record an address signal for identifying respective track in such a manner that address signals of adjacent ones of the first and second tracks do not overlap with each other in a radial direction.

According to the above configuration, in the first track having a spiral and groove-like shape and the second track having a spiral and land-like shape and adjacent to the first track, address signals each including address information for identifying the respective track are recorded in such a manner that they do not overlap with each other in a radial direction.

An optical disk of the present invention comprises a recording plane having a spiral first track and a spiral second track, information being to be recorded into and/or reproduced from the first and second tracks, wherein the first track is formed into a groove-like shape, the second track is formed between adjacent the first tracks and into a land-like shape, and the first and second tracks record an address signal, the address signal of the first track being opposite in polarity to the address signal of the second track, in such a manner that address signals of adjacent ones of the first and second tracks do not overlap with each other in a radial direction.

According to the above configuration, in the first track having a spiral and groove-like shape and the second track having a spiral and land-like shape and adjacent to the first track, address signals including address information are recorded in such a manner that they do not overlap with each other in a radial direction.

An optical information recording/reproduction apparatus of the present invention by which information is recorded on and/or reproduced from an optical disk, the optical disk comprises:
a spiral first track formed into a groove-like shape; and a spiral second track formed into a land-like shape, these first and second tracks being formed on the same recording plane, and
the apparatus comprising:
an optical head which irradiates the tracks with a light beam to record and/or reproduce a signal;
track designation means for selecting one of the first and second tracks, in order to record and /or reproduce informations;

focus means for focusing the light beam of the optical head on a track;

tracking means for causing the track to be tracked, and for selectively tracking the first and second tracks;

track search means for moving the optical head in order to search a track;

signal generation means for amplifying a signal reproduced by the optical head;

address reproduction means for reading out address signals of the first and second tracks;

data recording/reproduction control means for selecting one of the first and second tracks in accordance with an output of the address reproduction means on the basis of an output of the track designation means, and for actuating an operation of recording or reproducing information on the track or the sector; and information recording/reproduction means for conducting the operation of recording or reproducing information on the track or the sector of the recording plane, in accordance with an output of the data recording/reproduction control means, thereby to record informations into and/or reproduce from the first and second tracks.

According to the above configuration, when information is to be recorded, the track designation means outputs a land/groove selection signal corresponding to a track which is selected from the first and second tracks on the basis of a write command supplied from a host computer, the tracking means supplies an output according to a detection signal detected from an optical head, to the optical head on the basis of the land/groove selection signal, and drives the track search means to move the optical head so that a light beam tracks the track, and the focus means focuses the light beam of the optical head on the track.

In the information recording/reproduction apparatus of the present invention, the track designation means switches the tracking for the first and second tracks of the optical head by inverting a polarity of a tracking error signal.

According to the above configuration, when information is to be recorded onto or reproduced from an optical disk, the track designation means inverts the polarity of a tracking error signal obtained from the optical head, and then outputs the polarity-inverted signal to the optical head, thereby controlling the tracking of the first and second tracks.

On the other hand in view of the problems of the recording method in the prior art, the invention has an object of providing an information recording/reproduction apparatus, an information recording/reproduction method, and an optical disk which can provide a large capacity, and in which the defect alternation process can rapidly be conducted.

An optical information recording/reproduction apparatus of the present invention by which information is recorded onto and/or reproduced from an optical disk comprising first and second tracks which are formed on the same recording plane, the optical disk comprises:
a spare area in which a defective sector is to be alternatively recorded;
a defect list area in which a defect list including a set of the defective sector and an alternate sector is to be recorded; and
an information record area in which information is to be recorded,
the apparatus comprising:

an optical head which irradiates the tracks with a light beam to record and/or reproduce a signal;

track designation means for selecting one of the first and second tracks;

focus means for focusing the light beam of the optical head on the track;

tracking means for tracking the first or second track;

track search means for searching a target track;

address reproduction means for reading out an address signal of the track;

read/write gate generation means for selecting one of the first and second tracks in accordance with outputs of the track designation means and the address reproduction means, and for actuating an operation of recording or reproducing information on a target sector;

data recording/reproduction means for conducting recording and/or reproduction of data on the target sector in accordance with an output of the read/write gate generation means;

record verify and alternation means for verifying data which are recorded by the data recording/reproduction means, and for alternating a detected defective sector in the spare area;

defect list storage means for storing as a defect list a defective sector address and an alternate address which are results of the alternation operation of the record verify and alternation means; and apparatus control means for outputting control commands to the means, for monitoring states of the means, and for controlling operations of recording, reproducing, and verifying information on the optical disk.

According to the above-mentioned configuration of the present invention, the optical head conducts a recording and/or reproduction of a signal on an optical disk comprising first and second tracks which are formed on the same recording plane, the track designation means designates one of the first and second tracks, the focus means focuses a light beam on a track, the tracking means conducts tracking on the first and second tracks, the track search means searches a target track, the address reproduction means reads out an address signal of the track, the read/write gate generation means actuates the recording and/or reproduction of information on a target sector, and the data recording/reproduction means records and/or reproduces data. The record verify and alternation means verifies recorded data, and alternates a detected defective sector into a spare area, the defect list storage means stores a defect alternate address, and the apparatus control means controls the recording, reproduction and verify operations. In this way, the data recording, reproduction, verification, and the defect alternation process are conducted on the optical disk comprising first and second tracks which are formed on the same recording plane, so that the recording capacity is doubled as compared with that in the prior art.

BRIEF DESCRIPTION OF THE DRAWINGS

FIGS. 1(a) and 1(b) are a diagram showing the sector format of an optical disk which is a first embodiment of the invention.

FIGS. 2(a), 2(a'), 2(b) and 2(b') are a diagram showing the sector format of an optical disk which is a second embodiment of the invention.

FIGS. 3(a), 3(b) and 3(c) are a diagram showing the sector format of an optical disk which is a third embodiment of the invention.

FIGS. 4(a) and 4(b) are a diagram showing the format of an ID signal and the arrangement of an optical disk which is a fourth embodiment of the invention.

DESCRIPTION OF THE PREFERRED EMBODIMENTS

Figure 5:
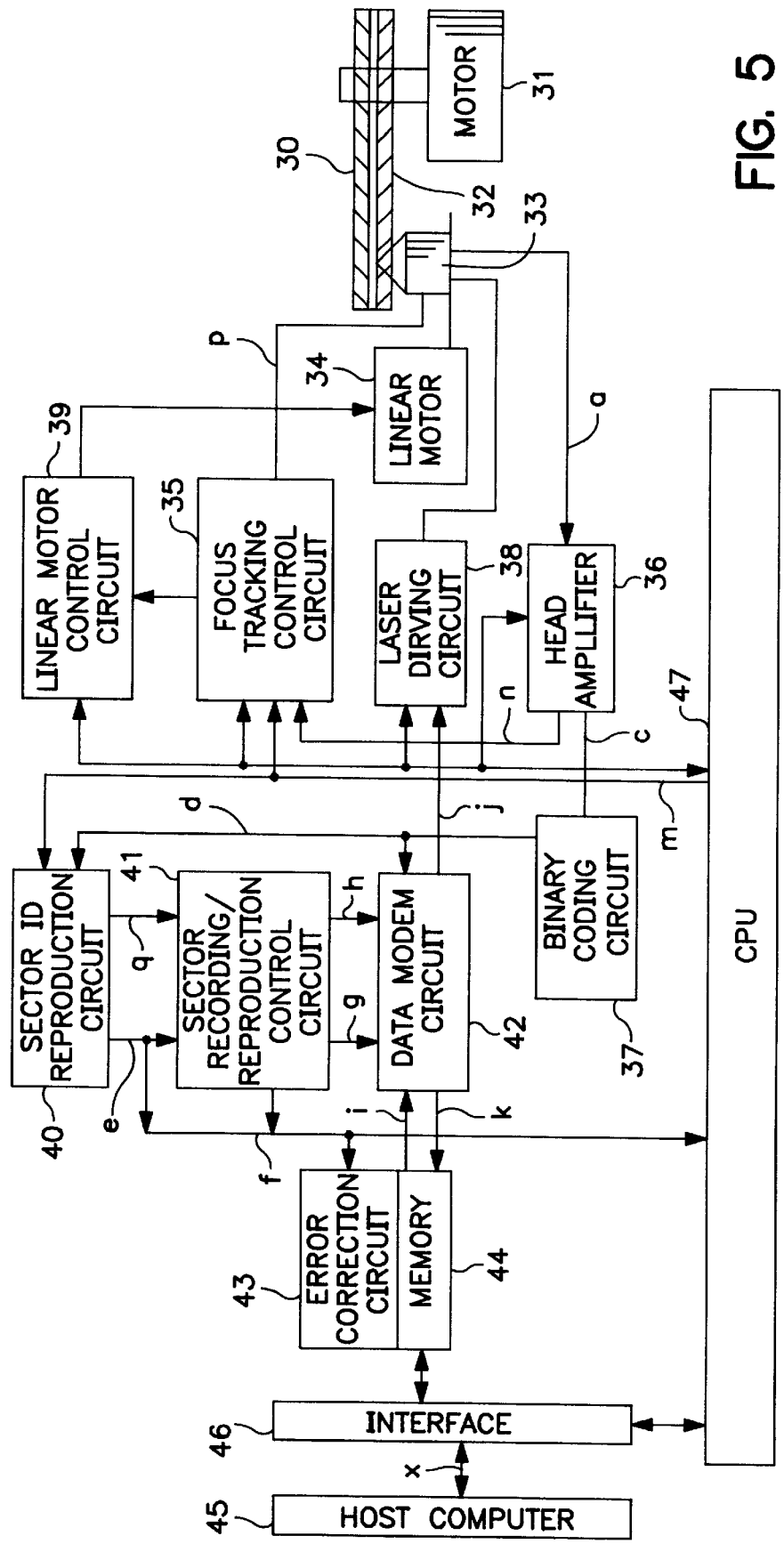
FIG. 5 is a block diagram of an embodiment of an information recording/reproduction apparatus which is to be applied to the optical disk of the invention.

Hereinafter, referring to the drawings, an optical information recording/reproduction apparatus of embodiments of the first invention will be described.

FIGS. 1(a) and 1(b) are diagrams showing the sector format of a land/groove record optical disk which is a first embodiment of the invention. In FIG. 1(a) shows the sector format of a groove record track which functions as the first track. A sector 13 consists of a sector ID field ID1 in which address signals A1 and A2 for the sector and modulated by a first modulation method are recorded, a data field DF in which data are recorded in a second modulation method, a gap G1 in which no signal is recorded, and a buffer field B1 for absorbing variations of the disk rotation and various time periods. The data field DF includes a synchronous clock field VFO 14 for pulling a clock signal, a data mark SYN 15 indicating the beginning of data, and user data and error correction codes 16.

FIG. 1(b) shows the sector format of a land record track which functions as the second track. A sector 17 consists of a sector ID field ID2 in which address signals a1, a2 and a3 for the sector are recorded in the second modulation method, a data field DF in which data are recorded in the second modulation method, a gap G2, and a buffer field B2.

The data field DF has the same configuration as that of FIG. 1(a). In FIGS. 1(a) and 1(b), for example, the PE (Phase Encoding) modulation which is a digital modulation method is employed as the first modulation method, and, for example, the (2-7) RLL (Run Length Limited) modulation which is a digital modulation method is employed as the second modulation method. Since the DR (Density Ratio) of the modulation methods is 1:3 and the reproduction of an RLL signal requires a PLL (Phase Lock Loop) circuit, an address signal is written twice in ID1 and thrice in ID2 so that the sectors 13 and 17 have the same length.

The ID1 and ID2 of the sectors 13 and 17 are arranged in a radial direction of the disk, and a cross-talk of about −15 dB occurs between the ID fields. Since the modulation methods of ID1 and ID2 are different from each other and ID1 and ID2 signal reproduction circuits operate in different modulation methods, however, respective ID signals can normally be reproduced without being affected by a cross-talk.

In FIGS. 1(a) and 1(b), only the ID fields of the groove record track and the land record track are subjected to recordings of different modulation methods. Alternatively, also the ID fields and the data fields may be subjected to recordings of different modulation methods. When at least the ID fields among the ID fields and the data fields are subjected to recordings of different modulation methods, the same effect can be attained.

FIGS. 2(a), 2(a'), 2(b) and 2(b') are a diagram showing the sector format of a land/groove record optical disk which is a second embodiment of the invention.

FIGS. 2(a), 2(a'), 2(b) and 2(b') the same reference numerals as those of FIGS. 1(a) and 1(b), designate blocks having the same functions. In FIGS. 2(a), 2(a'), 2(b) and 2(b'), ID3 and ID4 designate sector identification fields in which address information is recorded.

The sector format of a groove record track shown in FIG. 2(a) is the same as that of a land record track shown in FIG. 2(b). In the sector identification fields ID3 and ID4, signals which are modulated by the same modulation method are recorded so as to be opposite in polarity to each other. Specifically, in ID3, as shown in FIG. 2(a'), "1" of a channel bit of a modulated signal is recorded at the level of the land, and "0" at the level of the groove. In ID4, as shown in FIG. 2(b'), "1" of a channel bit is recorded at the level of the groove, and "0" at the level of the land.

The ID3 and ID4 of the sectors 13 and 17 are arranged in a radial direction of the disk, and a cross-talk of about −15 dB occurs between the ID fields. Since the ID signals in the land and the groove are opposite in polarity to each other, however, an ID signal reproduction circuit can read only an ID signal which has undergone a signal inversion process corresponding to the respective track, and therefore normally reproduce the respective ID signal without being affected by a cross-talk.

FIGS. 3(a), 3(b) and 3(c) are a diagram showing the sector format of a land/groove record optical disk which is a third embodiment of the invention. In FIG. 3(a) shows the sector format of a groove record track. The track 18 is divided into a plurality of sectors 19. FIG. 3(b) shows the sector format of a land record track. The track 20 is divided into a plurality of sectors 21. FIG. 3(c) shows the format of sector ID fields ID of the sectors 19 and 21. Each sector ID field consists of a VFO2 for clock synchronization, an address mark AM indicating the beginning of address information, a track address TA, a sector address SA, a land/groove identification signal 22, an error detection signal CRC, and a postamble PA. In FIGS. 3(a), 3(b) and 3(c), the initial sector 19 of the groove record track 18 is positionally shifted from the initial sector 21 of the land record track 20 by a distance G3, so that IDs of the sectors do not overlap with each other in the track direction. The land/groove identification signal 22 of each sector indicates whether the corresponding ID belongs to the groove record track 18 or to the land record track 20. For example, when the ID belongs to the groove record track 18, "0" is recorded, and, when the ID belongs to the land record track 20, "1" is recorded.

Since the IDs of the tracks 18 and 20 are arranged in a radial direction of the disk with being positionally shifted by G3, they are not mutually affected by a cross-talk. Even when a cross-talk occurs, the ID signal of the track which is currently tracked by the light beam is allowed to be normally reproduced, by checking the land/groove identification signal in the ID signal reproduction circuit. Since the ID signals are shifted in the track direction, also an effect that pits in the ID fields can easily be formed is produced.

FIGS. 4(a) and 4(b) are a diagram showing the arrangement of signals in a land/groove record optical disk which is a fourth embodiment of the invention.

In FIG. 4(a) shows the configuration of an address signal of each sector which is used in the embodiment. The configuration is the same as that shown in FIG. 3(c). FIG. 4(b) shows the relationship of the recording positions of the VFO2 fields which are respectively at the beginnings of the ID signals of a groove record track 23 and a land record track 24. Record pits 25 of a channel bit "1" of the address signal of the groove record track 23 are formed so as to correspond to the level of a land 28, and "0" is formed so as to correspond to the level of a groove 29. Record pits 26 of the address signal of the land record track 24 are formed in such a manner that a channel bit "1" corresponds to the level of the groove 29, and "0" to the level of the land 28. Also in the first and third embodiments, the pits 25 and 26 may be formed in a similar manner as described above. In the embodiment, the pits 25 and 26 are recorded with being shifted by one-half of the maximum frequency period T of the address signal, or so as to form a checkered pattern.

Since the record pits of the address signals of the tracks 23 and 24 are arranged in a radial direction of the disk with being positionally shifted by T/2, the influence of a cross-talk can greatly be suppressed. Even when an address signal is erroneously reproduced by a cross-talk, the ID signal of the track which is currently tracked by the light beam is allowed to be normally reproduced, by checking the land/groove identification signal 22.

In the first to fourth embodiments described above, the address signal may be composed of one of the following sets: the track address TA, and the sector address SA; the track identification signal 22, the address information AM, and the error detection signal CRC; and the track address TA, the sector address SA, the track identification signal 22, the address information AM, and the error detection signal CRC.

The optical disks described in the first to fourth embodiments are generally formed so that the depth of the groove record track is set to be $\lambda/(8 \cdot n)$ where $\lambda$ is the wavelength of a laser beam, and n is the refractive index of the disk substrate.

FIG. 5 is a view showing the configuration of an embodiment of an information recording/reproduction apparatus by which information is recorded onto and/or reproduced from the optical disk of the invention. Hereinafter, the description is made while setting the track designation means as a CPU 47, the track search means as a linear motor 34, the signal reproduction means as a head amplifier 36, the address reproduction means as a sector ID reproduction circuit 40, the data recording/reproduction control means as a sector recording/reproduction control circuit 41, and the information recording/reproduction means as a data modem circuit 42.

In FIG. 5, 30 designates an optical disk which is to be attached to a motor 31 so as to be rotated thereby, 32 designates a recording plane of the optical disk 30, 33 designates an optical head for focusing a laser beam on the recording plane 32, and 34 designates the linear motor (LM) which functions as the track search means, and which moves the optical head 33 to search a target track. The reference numeral 35 designates a focus tracking control circuit which consists of focus means for conducting a focus control of the light beam of the optical head 33, and tracking means for conducting a tracking control and a track retrace. The reference numeral 36 designates the head amplifier which functions as the signal reproduction means, and which amplifies and outputs a tracking error signal n and a reproduced signal c in a detection signal a from the optical head 33. The reference numeral 37 designates a binary coding circuit for binary-coding the reproduced signal c, 38 designates a laser driving circuit which drives a semiconductor laser of the optical head 33, and 39 designates a linear motor control circuit which controls the linear motor 34 so that the optical head 33 seeks the target track. The reference numeral 40 designates the sector ID reproduction circuit which functions as the address reproduction means, and which outputs the sector address e and the land/groove identification signal q of the track of a sector ID, from an output d of the binary coding circuit 37. The reference numeral 41 designates the sector recording/reproduction control circuit which functions as the data recording/reproduction control means, which compares the track sector address e with a target sector address of a CPU data bus f at which data are to be recorded or reproduced, to check whether they coincide with each other or not, and which generates a write gate signal g and a read gate signal h for the sector. The reference numeral 42 designates the data modem circuit which functions as the information recording/reproduction means, which conducts a digital modulation on coded data i with the (2-7) RLLC (Run Length Limited Code) or the like and outputs a modulated signal j, and which demodulates the binary-coded reproduced signal d and outputs demodulated data k. The reference numeral 43 designates an error correction circuit which generates coded data i wherein an error correction code is added to data to be recorded, and which detects an error in demodulated data k to correct the data, 44 designates a memory for temporarily storing data, 45 designates a host computer, 46 designates an interface IF to which the host computer 45 is connected through a SCSI (Small Computer System Interface) bus x, and 47 designates the CPU of a microcomputer which functions as the track designation means, and which controls the whole of the information recording/reproduction apparatus. In FIG. 5, m designates a land/groove selection signal which is output from the CPU 47 and supplied to the focus tracking control circuit 35 and the sector ID reproduction circuit 40, and which selects one of the recording/reproduction on the land record track and that on the groove record track.

Figure 6:
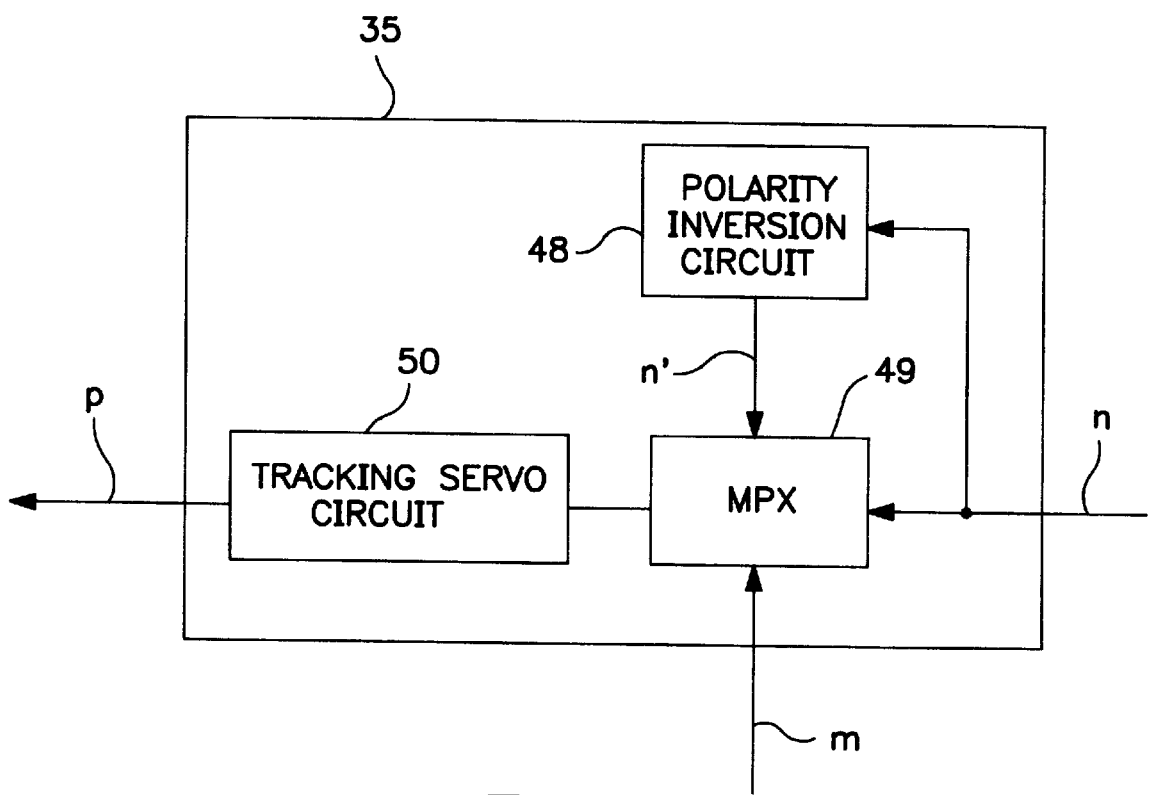
FIG. 6 is a block diagram of an embodiment of a focus tracking control circuit of the embodiment.

FIG. 6 is a view showing the configuration of a tracking control unit of the focus tracking control circuit 35 of FIG. 5. In the figure, 48 designates a polarity inversion circuit for the tracking error signal n, 49 designates a multiplexer MPX which selects the tracking error signal n or an inverted signal n' of the error signal in accordance with the land/groove selection signal m, 50 designates a tracking servo circuit, and p designates an actuator driving signal for driving a tracking actuator of the optical head 33. The land/groove selection signal m is switched and the polarity of the tracking error signal n is inverted, so that the tracking is conducted on the land record track or the groove record track.

Figure 7:
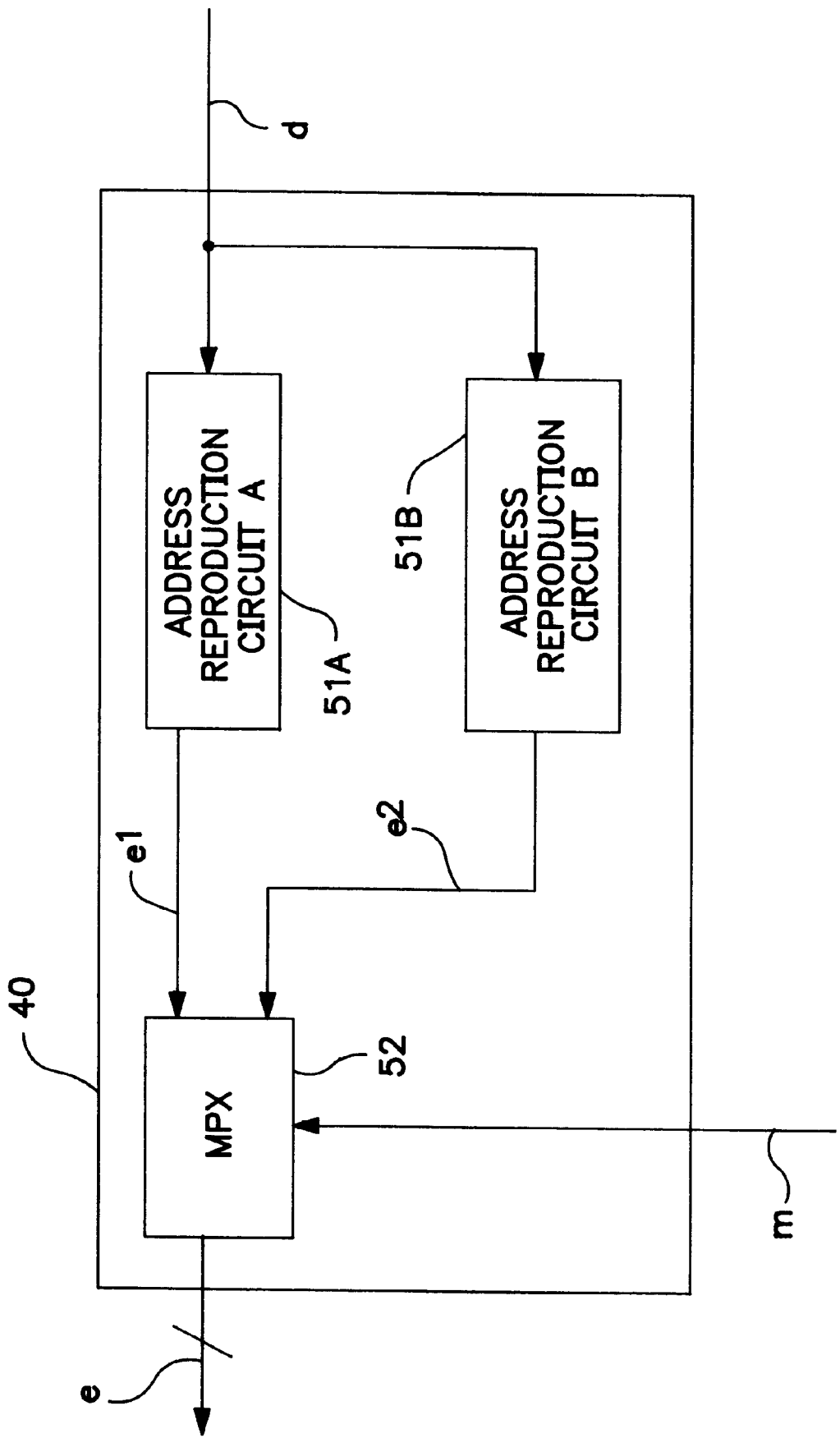
FIG. 7 is a block diagram of an embodiment of a sector ID reproduction circuit of the embodiment.

FIG. 7 is a view showing the configuration of the sector ID reproduction circuit 40 which is used when, in the optical disk of the first embodiment of FIG. 1, the signal modulation method of the sector ID field of the land record track is different from that of the groove record track. In the figure, 51A designates an address reproduction circuit A which reproduces the sector ID of the groove record track, 51B designates an address reproduction circuit B which reproduces the sector ID of the land record track, and 52 designates a multiplexer MPX which selects either of reproduction address outputs e1 and e2 of the address reproduction circuits 51A and 51B in accordance with the land/groove selection signal m.

Figure 8:
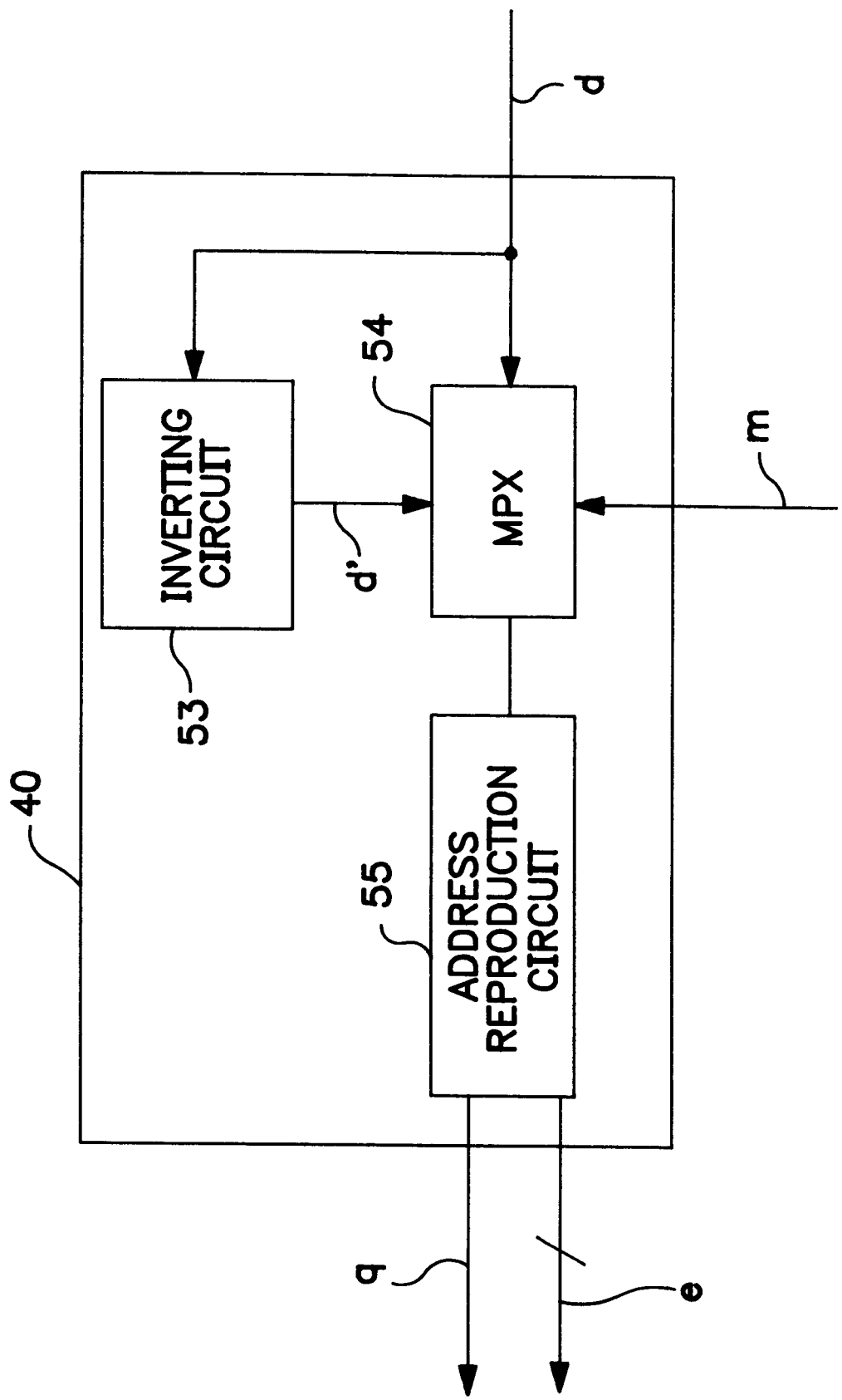
FIG. 8 is a block diagram of another embodiment of the sector ID reproduction circuit of the embodiment.

FIG. 8 is a view showing the configuration of the sector ID reproduction circuit 40 which is used when, in the optical disk of the second embodiment of FIGS. 2(a), 2(a'), 2(b) and 2(b'), the modulated signals of the sector ID fields of the land and groove record tracks are inverted in polarity with respect to each other. In the figure, 53 designates an inverting circuit which inverts the polarity of the binary-coded reproduced signal d, and 54 designates a multiplexer MPX which selects the binary-coded reproduced signal d or an inverted signal d' of the reproduced signal in accordance with the land/groove selection signal m, 55 designates an address reproduction circuit, and q designates the land/groove identification signal.

Figure 9:
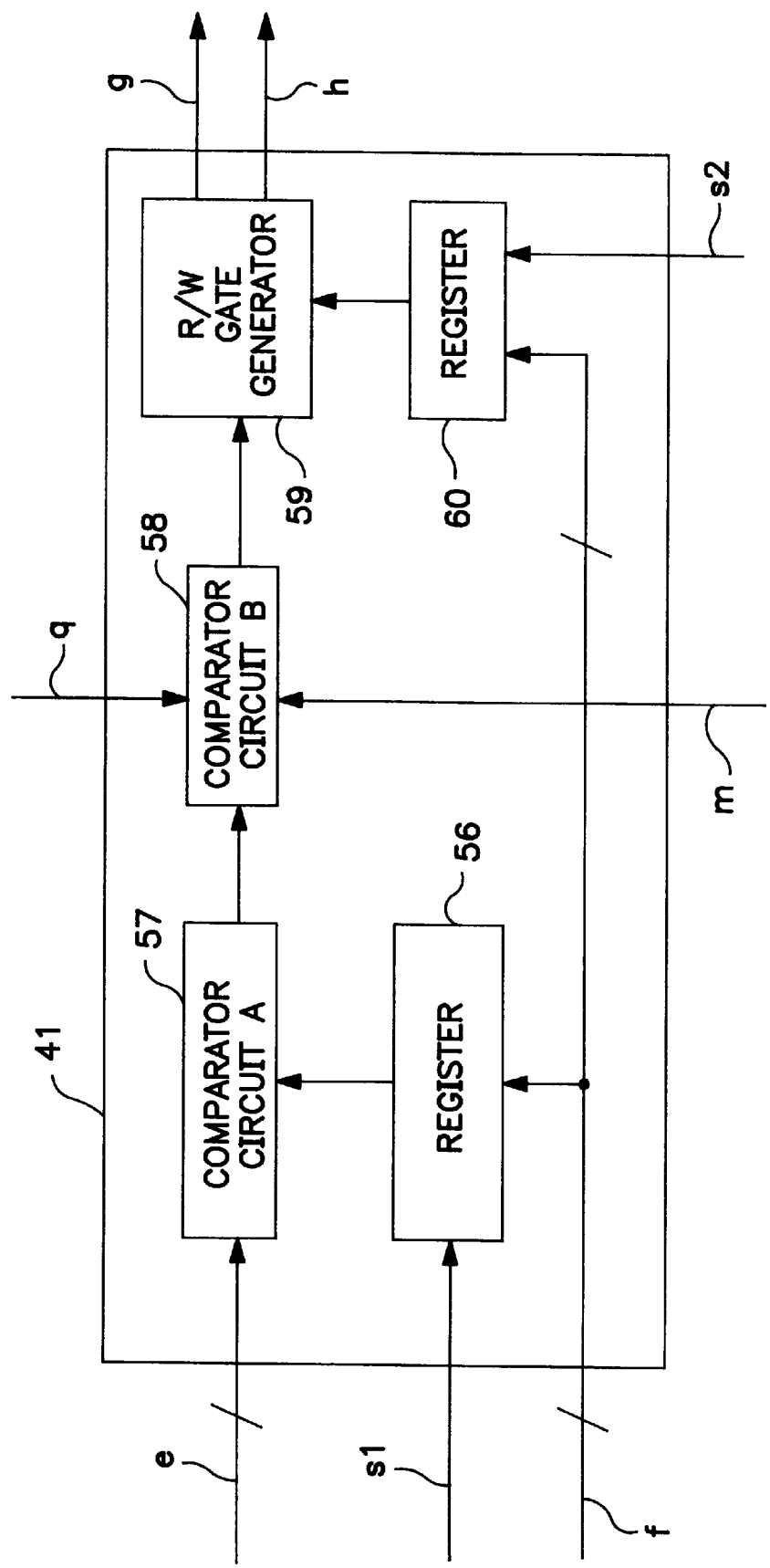
FIG. 9 is a block diagram of an embodiment of a sector recording/reproduction control circuit of the embodiment.
Figure 10A:
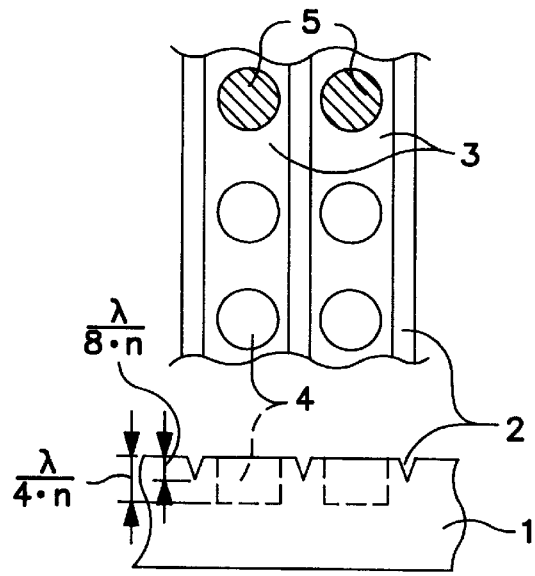
FIGS. 10(a), 10(b) and 10(c) are a diagram illustrating an information recording conducted on an optical disk of the prior art.
Figure 10B:
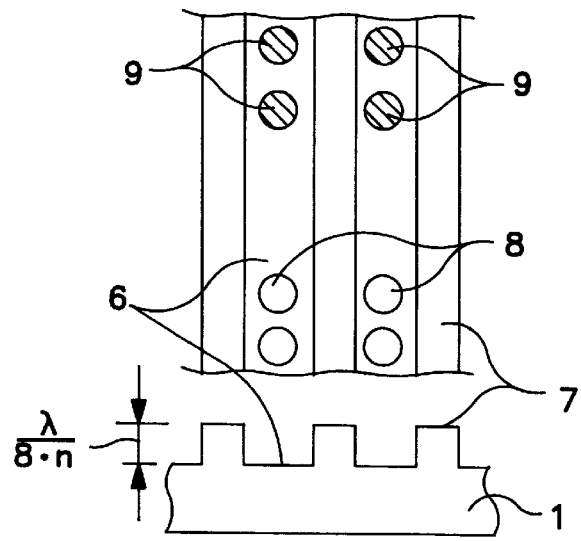
Figure 10C:
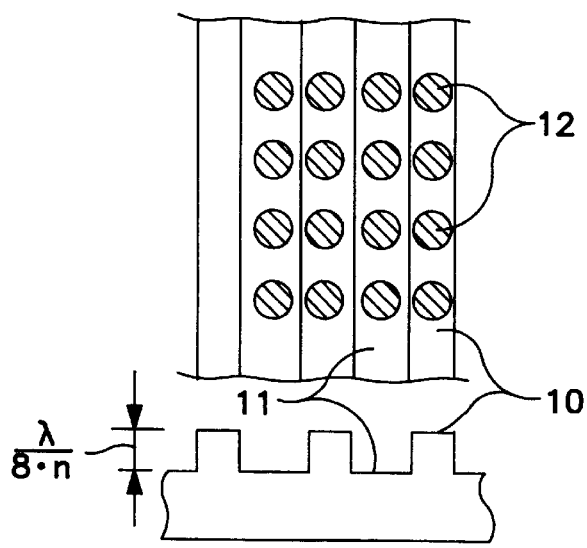

In the circuit of FIG. 8, when, in the optical disk of the third embodiment of FIGS. 3(a), 3(b) and 3(c) the IDs of the groove record track 18 and the land record track 20 which are disposed so as not to positionally overlap with each other and recorded in the same modulation method are to be reproduced, the land/groove selection signal m is set so that the multiplexer 54 selects the binary-coded reproduced signal d, whereby the land record track or the groove record track is identified with using the land/groove identification signal q and combining the circuit with that of FIG. 9 which will be described below.

FIG. 9 is a view showing in detail the configuration of the sector recording/reproduction control circuit 41 which is applied to the optical disks shown in FIGS. 3(a)–(c) and 4(a)–(b). In the figure, 56 designates a register which latches the target address of the CPU data bus f in response to a strobe s1, 57 designates a comparator circuit A which compares an output of the register 56 with the reproduction address e, 58 designates a comparator circuit B which compares the land/groove identification signal q with the land/groove selection signal m and outputs a coincidence signal when the two signals coincides with each other under the state where the comparator circuit A 57 outputs a coincidence signal, and 59 designates a read/write gate generator which outputs at the timing of the output of the comparator circuit B 58 a read or write command that has been latched in a register 60 from the CPU data bus f in response to a strobe s2, as the write gate g or the read gate h to the data modem circuit 42.

The operation of the recording/reproduction apparatus which is configured as described above and records and/or reproduces information on a double sided optical disk will be described.

Hereinafter, the data record operation will be described.

The host computer 45 outputs the write command to the SCSI bus x. The CPU 47 receives the command through the IF 46 to interpret it. Depending on whether the target track is the land record track or the groove record track, the CPU 47 outputs the land/groove selection signal m so that the optical head 33 conducts the focus tracking on the given record track. As shown in FIG. 6, the focus tracking control circuit 35 makes the polarity of the tracking error signal n inverted or non-inverted which is supplied from the optical head 33 depending on the land/groove selection signal m, and supplies the actuator driving signal p to a tracking actuator coil of the optical head 33. The focus tracking control circuit then supplies a seek command for the target track to the linear motor driving circuit 39 to drive the linear motor 34, thereby moving the optical head 33 to the target track.

Data to be recorded which are supplied from the host computer 45 are once stored in the memory 44. The error correction circuit 43 outputs the coded data i wherein an error correction code is added to the data to be recorded.

The CPU 47 sets a record sector address and the record command into the sector recording/reproduction control circuit 41 which in turn compares the record sector address with the address output e of the ID reproduction circuit 40. When the given sector is detected as a result of coincidence of the addresses, the write gate signal g is supplied to the data modem circuit 42. The write gate g actuates the data modem circuit 42 so that the coded data i are modulated with the (2-7) RLL, and the modulated signal j is supplied to the laser driving circuit 38.

The optical head 33 records the modulated signal j into the sector of the recording plane 32. The above data record operation is repeated in the given number of sectors.

Hereinafter, the data read operation will be described.

The host computer 45 outputs the read command to the SCSI bus x. The CPU 47 receives the command through the IF 46 to interpret it. Depending on whether the target track is the land record track or the groove record track, the CPU 47 outputs the land/groove selection signal m so that the optical head 33 conducts the focus tracking on the given record track. As shown in FIG. 6, the focus tracking control circuit 35 makes the polarity of the tracking error signal n inverted or non-inverted which is supplied from the optical head 33 depending on the land/groove selection signal m, and supplies the actuator driving signal p to the tracking actuator coil of the optical head 33. The focus tracking control circuit then supplies a seek command for the target track to the linear motor driving circuit 39 to drive the linear motor 34, thereby moving the optical head 33 to the target track.

The CPU 47 sets a read sector address and the read command into the sector recording/reproduction control circuit 41 which in turn compares the read sector address with the address output e of the ID reproduction circuit 40. When the sector recording/reproduction control circuit 41 detects the given sector as a result of coincidence of the addresses, the read gate signal h is supplied to the data modem circuit 42.

The data modem circuit 42 is actuated in response to the read gate h, and demodulates the detection signal d detected by the optical head 33, to obtain the reproduced data k. The reproduced data k are then stored in the memory 44.

The reproduced data which are stored in the memory 44 are subjected to the error detection and correction in the error correction circuit 43, and again stored in the memory 44. The reproduced data which have undergone the error correction are transferred to the host computer 45 through the interface 46. The above data read operation is repeated in the given number of sectors.

The operations of the ID reproduction circuit 40 and the sector recording/reproduction control circuit 41 will be described in detail while comparing them with the embodiments of the optical disks of the invention to which the circuits are applied.

To the optical disk of the first embodiment [FIGS. 1(a) and 1(b)], applied is the ID reproduction circuit 40 having the configuration shown in FIG. 7. In the optical disk of FIGS. 1(a) and 1(b), the ID fields of the land record track and the groove record track are modulated in different modulation methods and recorded. In FIG. 7, therefore, the first and second address reproduction circuits 51A and 51B simultaneously conduct the reproduction operation on the binary-coded reproduced signal d. When the modulation method of the binary-coded reproduced signal d coincides with the modulation methods of the first and second address reproduction circuits 51A and 51B, the reproduced address signals e1 and e2 are output. One of the address signals e1 and e2 which corresponds to the land/groove selection signal m is selected by the multiplexer 52 and then output as the reproduced address signal e.

To the optical disk of the second embodiment [FIGS. 2(a), 2(a'), 2(b) and 2(b')], applied are the ID reproduction circuit 40 having the configuration shown in FIG. 8, and the sector recording/reproduction circuit 41 having the configuration shown in FIG. 9.

In the optical disk of FIGS. 2(a), 2(a'), 2(b) and 2(b'), the address signals of the ID fields of the land record track and the groove record track are recorded in such a manner that they are opposite to each other in polarity. In FIG. 8, the multiplexer 54 selects one of the binary-coded reproduced signal d and the binary-coded reproduced signal d' which has been inverted by the inverting circuit 53, in accordance with the land/groove selection signal m. The selected signal is demodulated by the address reproduction circuit 55 which in turn outputs the reproduced address signal e and the land/groove identification signal q to the sector recording/reproduction control apparatus 41 of FIG. 9.

In FIG. 9, the target address of the CPU data bus f is latched in the register 56 in response to the strobe s1, and compared with the reproduced address signal e in the comparator circuit 57. The land/groove identification signal q is compared with the land/groove selection signal m. The write command or the read command of the CPU data bus f is latched in the register 60 in response to the strobe s2, and is processed by AND operation with the output of the comparator circuit 58 so that the write gate g or the read gate h is output. The write gate g or the read gate h is supplied to the data modem circuit 42, thereby actuating the data modulation or the data demodulation.

To the optical disk of the third embodiment [FIGS. 3(a), 3(b) and 3(c)], applied are the ID reproduction circuit 40 having the configuration shown in FIG. 8, and the sector recording/reproduction circuit 41 having the configuration shown in FIG. 9.

In the optical disk of FIGS. 3(a), 3(b) and 3(c), the address signals of the ID fields of the land record track and the groove record track are recorded in such a manner that the ID fields do not overlap with each other in the track direction. The reproduction of an address, and the generation of the write gate or the read gate are conducted in the same manner as those applied to the optical disk of the second embodiment, except that the multiplexer 54 in FIG. 8 always selects the binary-coded reproduced signal d.

To the optical disk of the fourth embodiment (FIGS. 4(a) and 4(b)), applied are the ID reproduction circuit 40 having the configuration shown in FIG. 8, and the sector recording/reproduction circuit 41 having the configuration shown in FIG. 9.

In the optical disk of FIGS. 4(a) andb 4(b), the address signals of the ID fields of the land record track and the groove record track are recorded in such a manner that pits are shifted by T/2 in the track direction or form a checkered pattern. The reproduction of an address, and the generation of the write gate or the read gate are conducted in the same manner as those applied to the optical disk of the second embodiment, except that the multiplexer 54 in FIG. 8 always selects the binary-coded reproduced signal d.

According to the configuration described above, a cross-talk between land and groove record tracks which are adjacent to each other is reduced as compared with that in the prior art by making the modulation methods and/or the signal polarities different from each other, or changing the positions of IDs or the pit phase, while increasing the recording density of the optical disk of the land/groove recording to a level higher than that of the prior art, whereby data or an ID signal can be read out with a reduced error level and without being affected by a cross-talk.

The first to fourth embodiment of the optical disk described above may be combinedly executed in order to attain the object of the invention.

According to the configuration set forth in claim 1, since information is recorded into the first and second tracks in different modulation methods, the recording density can be increased as compared with that in the prior art, and a cross-talk between the first and second tracks can be reduced so that a recording/reproduction error due a the cross-talk between the first and second tracks is prevented from occurring in an ID signal or a data signal.

According to the configuration set forth in claim 3, since information is recorded into the first and second tracks in the same modulation method and in opposite polarities, the recording density can be increased as compared with that in the prior art, and a cross-talk between the first and second tracks can be reduced so that a recording/reproduction error due to a cross-talk between the first and second tracks is prevented from occurring in an ID signal or a data signal.

According to the configuration set forth in claim 4, since address signals each including address information for identifying the respective track are recorded into the adjacent first and second tracks in such a manner that they do not overlap with each other in a radial direction, the recording density can be increased as compared with that in the prior art, and a cross-talk between the first and second tracks can be reduced so that a recording/reproduction error due to a cross-talk between the first and second tracks is prevented from occurring in an ID signal or a data signal.

According to the configuration set forth in claim 5, since address signals which are address information are recorded into the adjacent first and second tracks in polarities opposite to each other and in such a manner that they do not overlap with each other in a radial direction, the recording density can be increased as compared with that in the prior art, and a cross-talk between the first and second tracks can be reduced so that a recording/reproduction error due to a cross-talk between the first and second tracks is prevented from occurring in an ID signal or a data signal.

According to the configuration set forth in claim 12, since, when information is to be recorded onto or reproduced from an optical disk, the tracking for the first and second tracks is controlled while the track designation means outputs a tracking error signal obtained from the optical head, to the optical head with inverting the polarity of the signal, information can be recorded onto or reproduced from the optical disk so that the recording density can be increased as compared with that in the prior art, and that a cross-talk between the first and second tracks can reduced and a recording/reproduction error due to a cross-talk between the first and second tracks is prevented from occurring in an ID signal or a data signal.

According to the configuration set forth in claim 13, since, when information is to be recorded onto or reproduced from an optical disk, the address reproduction means compares the output of the track designation means with the track identification signal of the address reproduction means, and, when the output of the track designation means coincides with the track identified by the track identification signal, outputs a reproduction address signal corresponding to the track, information can be recorded onto or reproduced from the optical disk so that the recording density can be increased as compared with that in the prior art, and that a cross-talk between the first and second tracks can reduced and a recording/reproduction error due to a cross-talk between the first and second tracks is prevented from occurring in an ID signal or a data signal.

On the other hand hereinafter, embodiments of the second invention will be described with reference to the drawings.

Figure 11:
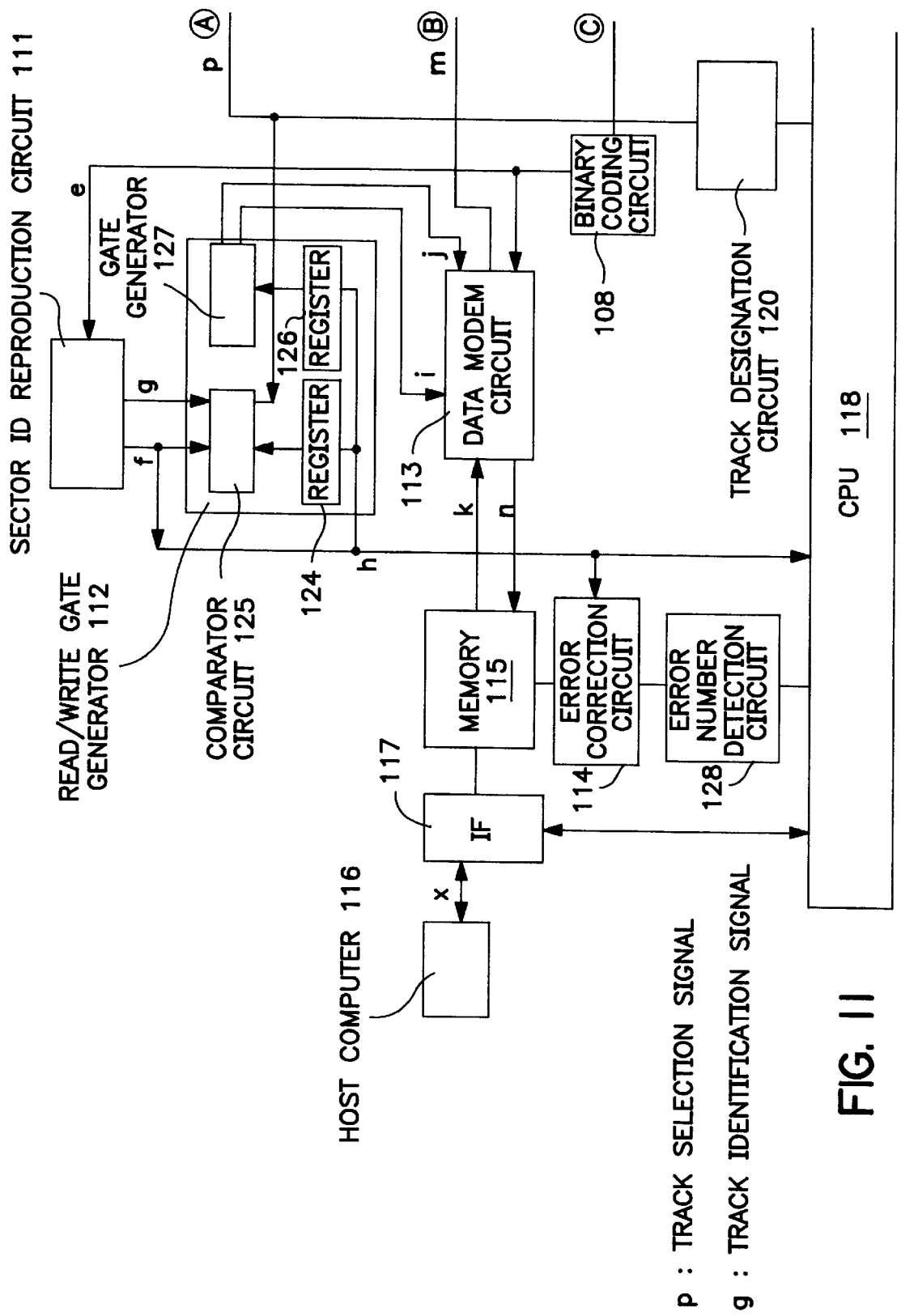
FIG. 11 is a block diagram showing a part of the configuration of an embodiment of an information recording/reproduction apparatus which is applied to the optical disk of the invention.
Figure 12:
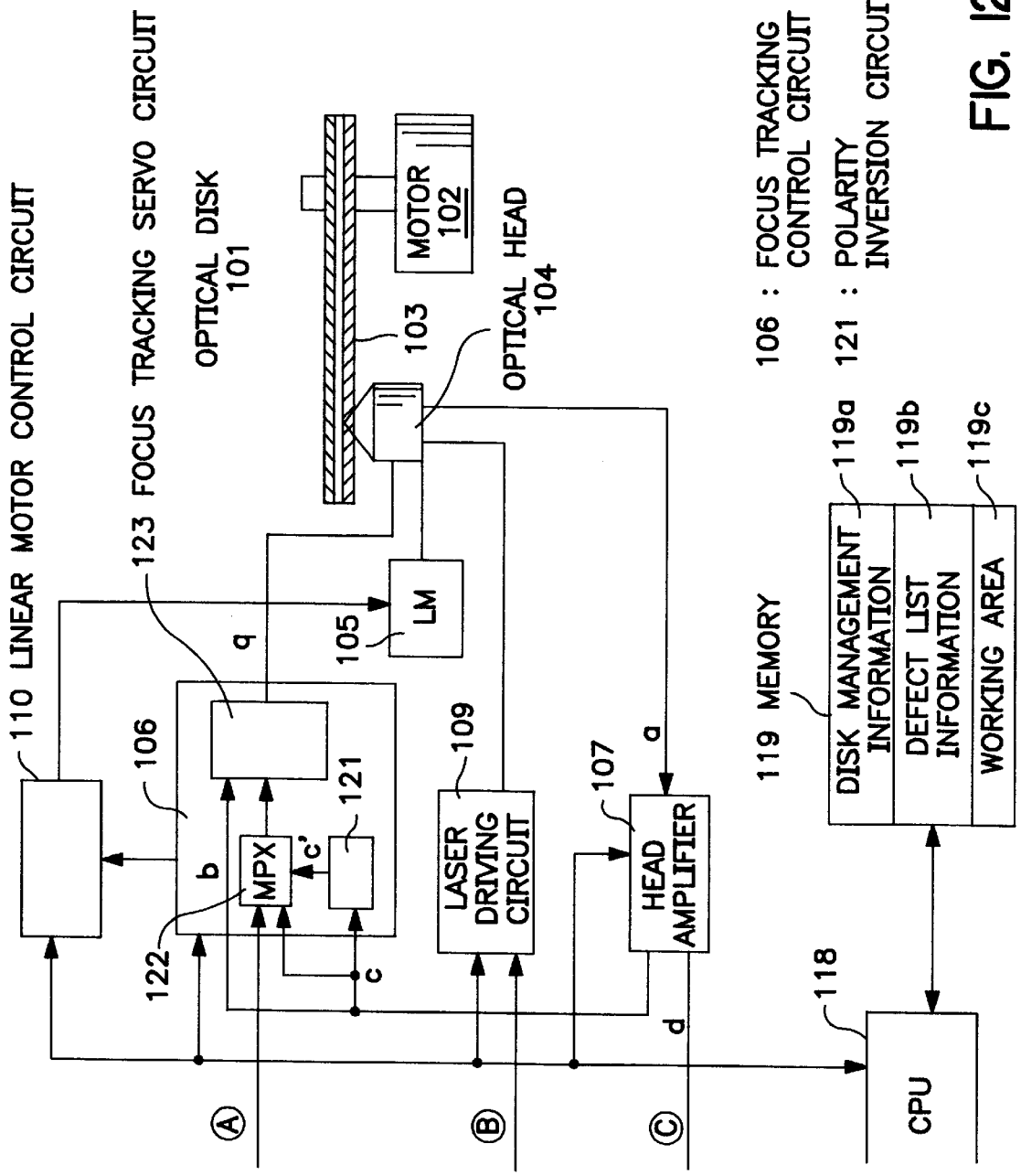
FIG. 12 is a block diagram showing the remaining part of the configuration of the embodiment of the information recording/reproduction apparatus which is applied to the optical disk of the invention.

FIGS. 11 and 12 are block diagrams showing the configuration of an embodiment of an information recording/reproduction apparatus which is applied to the optical disk of the invention. In FIGS. 11 and 12, 101 designates an optical disk attached to a motor 102, 102 designates the motor for rotating the optical disk 101, 103 designates a recording plane of the optical disk 101, 104 designates an optical head for focusing a laser beam on the recording plane 103, 105 designates a linear motor (LM) which moves the optical head 104 to search a target track, 106 designates a focus tracking control circuit which conducts a focus/tracking control of a light beam and a track retrace on the optical head 104, 107 designates a head amplifier which conducts addition and subtraction on detection signals of the optical head 104 to obtain a focus error signal b, a tracking error signal c, and a reproduced signal d, 108 designates a binary coding circuit for binary-coding the reproduced signal d to obtain a binary-coded signal e, 109 designates a laser driving circuit which drives a semiconductor laser of the optical head 104, and 110 designates a linear motor control circuit which controls the linear motor 105 so that the optical head 104 seeks the target track. The reference numeral 111 designates a sector ID reproduction circuit which reads out a track address and sector address f, and a track identification signal g of a sector ID, from the binary-coded signal e. The reference numeral 112 designates a read/write gate generator which compares the track address and sector address f with a target sector address of a CPU data bus h at which data are to be recorded or reproduced, and which generates a write gate signal i and read gate signal j for the sector. The reference numeral 113 designates a data modem circuit which conducts a digital modulation on coded data k with the (2-7) RLLC (Run Length Limited Code) or the like, to output a modulated signal m, and which demodulates the binary-coded reproduced signal e and outputs demodulated data n. The reference numeral 114 designates an error correction circuit which generates coded data k wherein an error correction code is added to data to be recorded, and which detects and corrects an error in the demodulated data n, 115 designates a memory for temporarily storing data, 116 designates a host computer, 117 designates an interface IF to which the host computer 116 is connected through a SCSI (Small Computer System Interface) bus x, 118 designates a microcomputer (CPU) which controls the whole of the information recording/reproduction apparatus, 119 designates a memory for storing disk management information, defect list information, etc., of the optical disk 101, 128 designates an error number detection circuit which counts the number of errors detected by the error correction circuit, for each sector, and 129 designates a working area. The reference numeral 120 designates a track designation circuit for outputting a track selection signal p which is output from the CPU 118 to be applied to the focus tracking control circuit 106 and the sector ID reproduction circuit 111, and which selects either of the recording/reproduction of the first track wherein data are recorded into a groove, and the recording/reproduction of the second track wherein data are recorded onto a land.

In the focus tracking control circuit 106, 121 designates a polarity inversion circuit for the tracking error signal c, 122 designates a multiplexer (MPX) which selects the tracking error signal n or an inverted signal n' of the error signal in accordance with the track selection signal p, 123 designates a focus tracking servo circuit, and q designates an actuator driving signal for driving a tracking actuator of the optical head 104. The polarity of the tracking error signal c is inverted in accordance with the track selection signal p, so that the tracking is conducted on the first track or the second record track.

In the read/write gate generator 112, 124 designates a register which latches the target address of the CPU data bus h, 125 designates a comparator circuit which compares an output of the register 124 with the reproduction address f, and the track identification signal g with the track designation signal p, 126 designates a register for latching the read or write command from the CPU data bus h, and 127 designates a gate generator which outputs the write gate signal i or the read gate signal j in response to the output of the comparator circuit 125 or that of the register 126 to the data modem circuit 113, thereby actuating the data modulation or the data demodulation.

A memory 119a reads out data of the subject sector from the disk management area of the optical disk 101 as required, or reads out and stores a defect list area address, a spare area address, a data record area address, defect management identification information, and volume management method identification information. In accordance with the contents of the memory 119, the CPU 118 controls the data recording and the defective sector alternation process of the first and second track of the optical disk 101. The reference numeral 119b designates a memory for recording defect list information, and 119c designates a working area for conducting the defect alternation process.

Figure 13A:
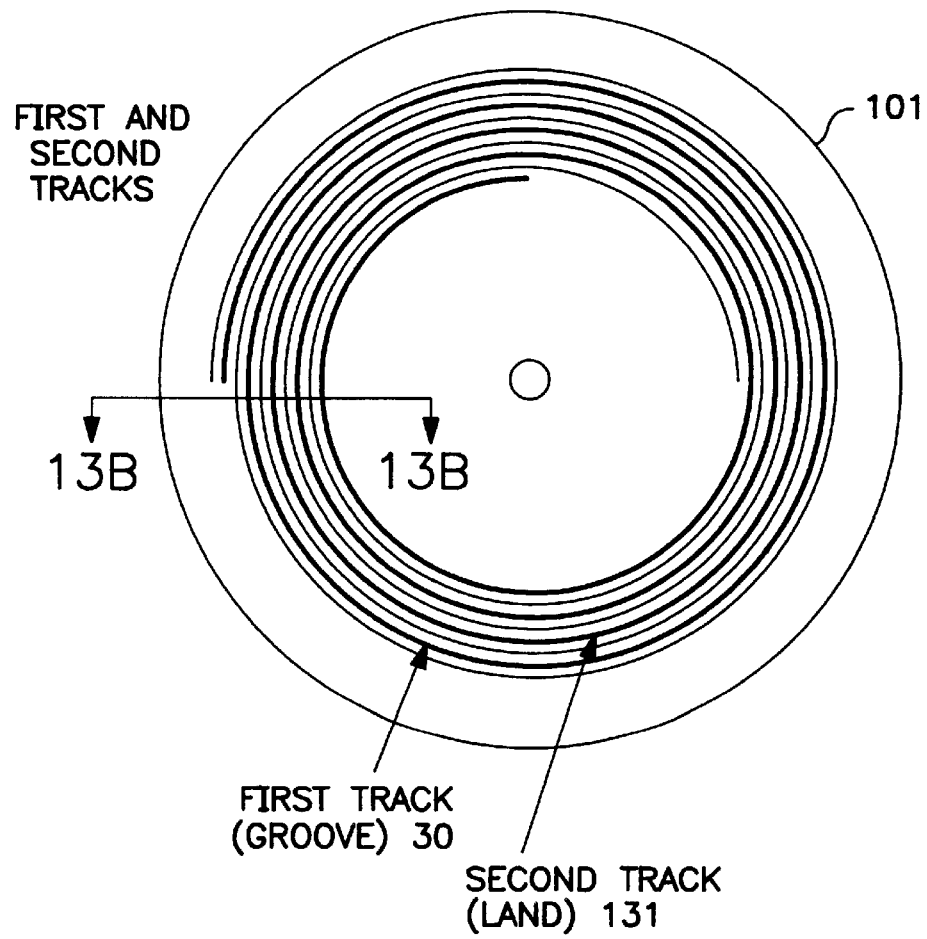
FIGS. 13(a)–13(b) are a view showing the appearance of an optical disk of an embodiment of the invention in which a first track records data into a groove and a second track records data on a land.
Figure 13B:
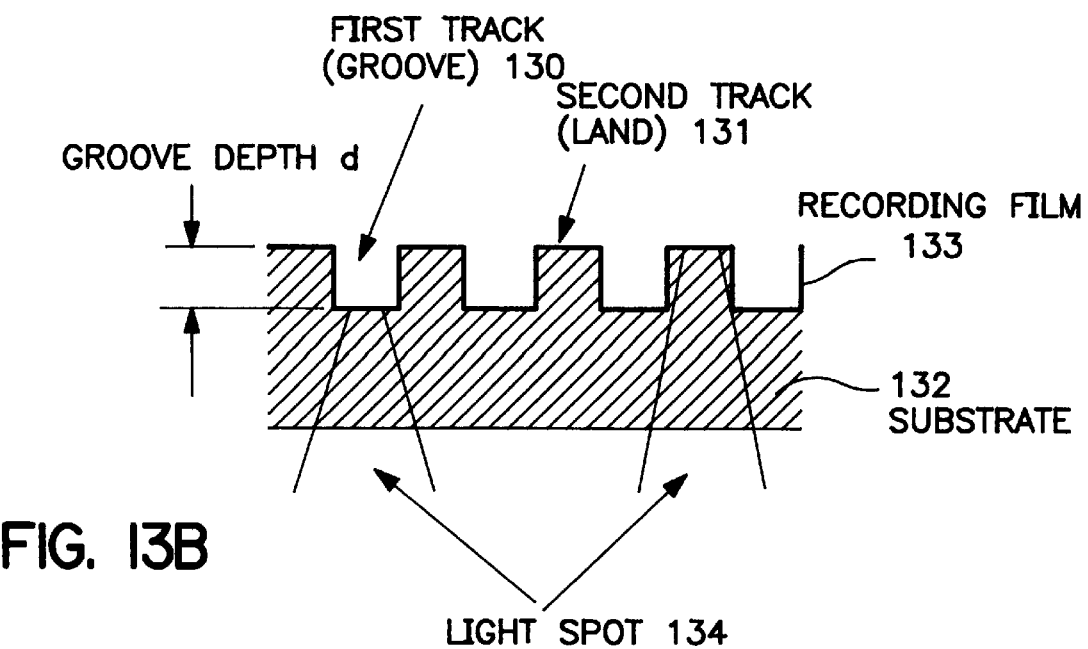

FIG. 13 is a view showing the appearance of an optical disk of an embodiment of the invention in which a first track records data into a groove and a second track records data onto a land. In FIG. 13, an ID signal is not shown. FIG. 13(a) is a plan view of the first and second tracks, and FIG. 13(b) is a section view of portion A–A' of FIG. 13(a).

In FIG. 13, 130 designates the first track which is a groove-like spiral guide track, 131 designates the second track consisting of a land which is sandwiched by the first track 130, 132 designates a substrate of the optical disk, 133 designates a recording film, and 134 designates a light spot by which information is recorded into or reproduced from the first and second tracks. The first track 130 is a groove of a depth d. In order to suppress the amplitudes of the tracking signal and the reproduced signal, and the degree of a cross-talk between the first and second tracks, the depth d is set to be about $\lambda/6n$.

Figures 14A, 14B:
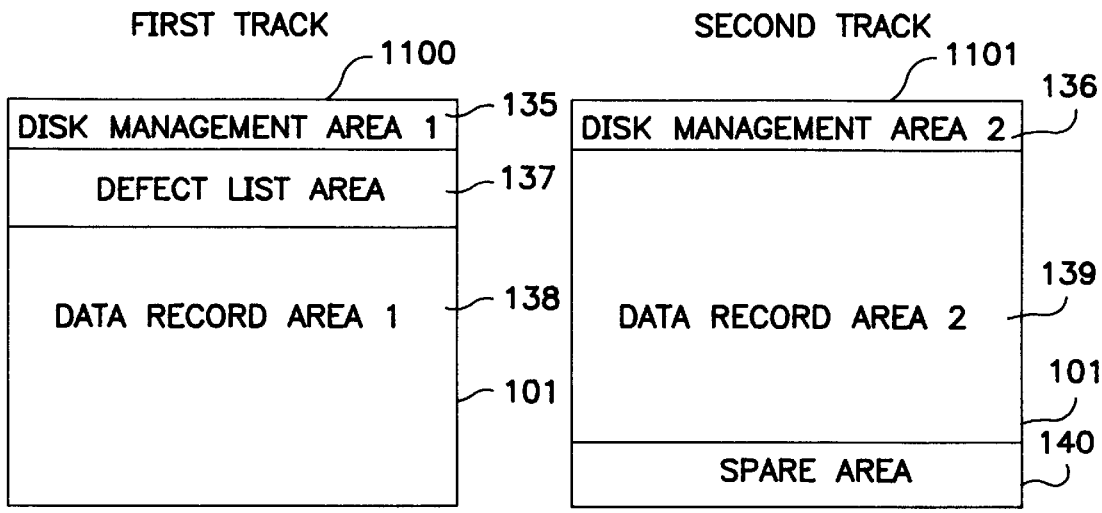
FIGS. 14(a)–14(b) are a diagram showing areas in a disk of a first embodiment of the invention.

FIG. 14 is a diagram showing areas in the disk of a first embodiment of the invention. In FIG. 14, (a) shows a recording plane 1100 consisting of the first track, and (b) shows a recording plane 1101 consisting of the second track.

The reference numerals 35 and 36 respectively designate the disk management areas formed in the recording planes 1100 and 1101 of the first and second tracks of the optical disk 101, 137 designates the defect list area for managing a defective sector and an alternate sector for the defective sector, 138 and 139 designate data record areas for recording data, and 140 designates the spare area for alternatively recording a defective sector. The defect list area 137 is formed on one side of the disk 101 or in the first track in the embodiment of FIG. 14, and collectively manages defective sectors of the data record areas 138 and 139. Defective sectors are alternated in the spare area 140 in a lump.

As described above, according to the invention, the recording planes 1100 and 1101 are collectively processed. Therefore, it is easy to manage the data record areas 138 and 139 of the disk as one volume, and the spare area can be utilized effectively. In the invention, a single defect list area is used. Even when an access extending over both the first and second tracks occurs, therefore, it is not necessary to read out the defect list area each time, whereby the process can be done rapidly.

Figures 15A, 15B:
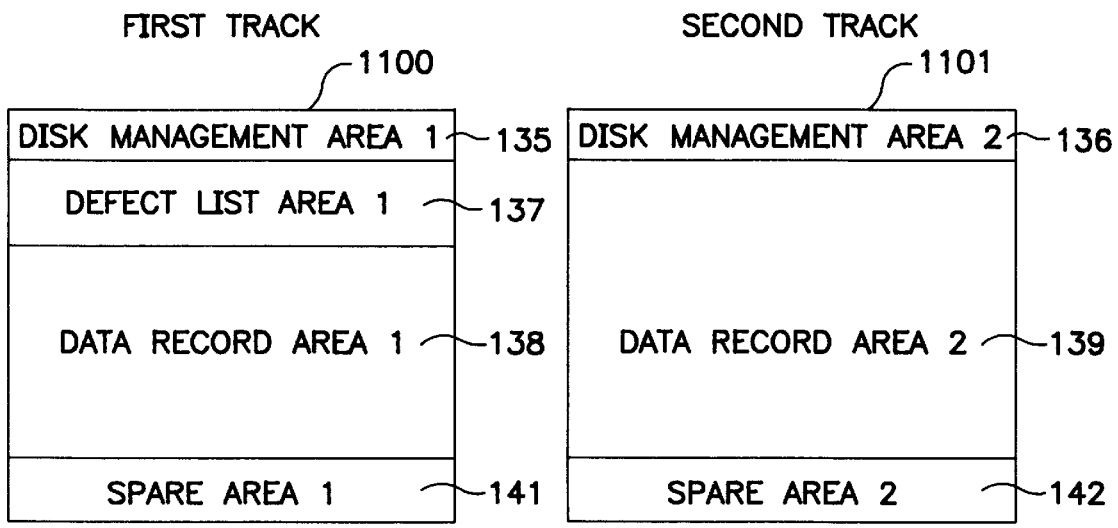
FIGS. 15(a)–15(b) are a diagram showing areas in a disk of a second embodiment of the invention.

FIG. 15 is a diagram showing areas in the disk of a second embodiment of the invention.

In FIG. 15, (a) shows a recording plane 1100 consisting of the first track, and (b) shows a recording plane 1101 consisting of the second track. In the first and second tracks of the optical disk 101, formed are disk management areas 35 and 36, data record areas 138 and 139 for recording data, and spare areas 141 and 142 for alternatively recording a defective sector. A defect list area 137 is formed on one side of the disk 101 or in the first track in the embodiment of FIG. 15.

A defective sector in the data record area 138 is alternated in the spare area 141, and that in the data record area 139 is alternated in the spare area 142.

As described above, according to the invention, a defective sector which is detected during a process of conducting a recording on the first or second track is alternated in the spare area 141 or 142 of the track. Therefore, it is not necessary to change the track selection from the first track (or the second track) to the second track (or the first track). The track selection must be conducted while the polarity of the tracking error signal c is inverted by the tracking circuit 106, and hence the time for pulling the retracking into the target track is not required. In other words, the alternation process can be conducted rapidly.

Figures 16A, 16B:
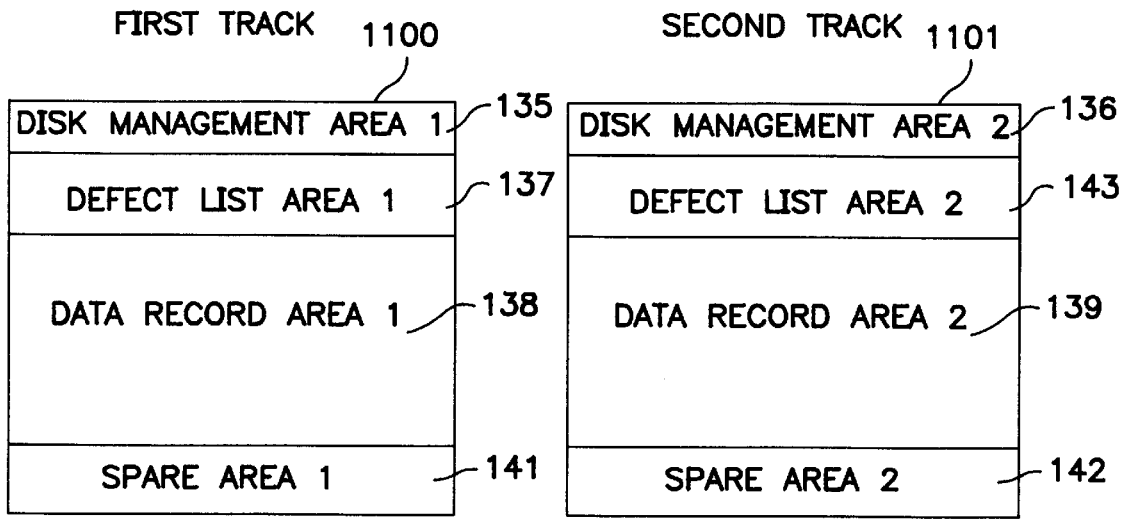
FIGS. 16(a)–16(b) are a diagram showing areas in a disk of a third embodiment of the invention.

FIG. 16 is a diagram showing areas in the disk of a third embodiment of the invention.

In FIG. 16, (a) shows a recording plane 1100 consisting of the first track, and (b) shows a recording plane 1101 consisting of the second track. In the figure, 35 and 36 respectively designate disk management areas formed in the first and second tracks of the optical disk 101, 137 and 143 designate the defect list areas, 138 and 139 designate data record areas for recording data, and 141 and 142 designate spare areas for alternatively recording a defective sector.

A defective sector in the data record area 138 is alternated in the spare area 141, and that in the data record area 139 is alternated in the spare area 142.

As described above, according to the invention, the alternation process for a defective sector in the recording plane 1100 is conducted in a combination of the defect list area 137 and the spare area 141, and that in the recording plane 1101 is conducted in a combination of the defect list area 143 and the spare area 142. Therefore, it is not necessary to conduct the track change between the first and second tracks, and hence the time for repulling the tracking is not required. Since the spiral track access can be utilized efficiently, the time to wait the rotation of the disk due to the track change can be shortened, thereby allowing the alternation process for a defective sector to be conducted rapidly.

In the recording planes 1100 and 1101, the data record areas 138 and 139 can be secured so as to have the same capacity. In a system using the optical disk, therefore, the system design can be simplified. Since the recording planes 1100 and 1101 and be subjected independently to the defect process, the structure of data to be written into the data record areas 138 and 139 can easily be managed while being divided into plural volumes.

Figures 17A, 17B:
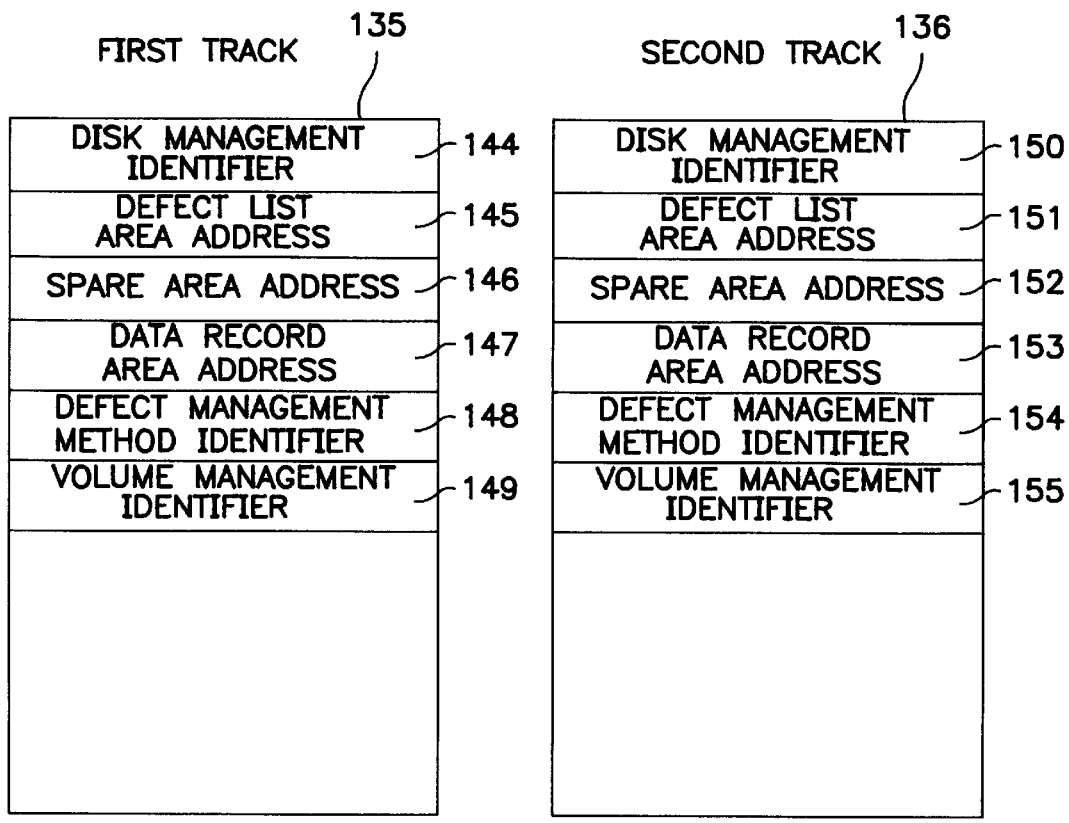
FIGS. 17(a)–17(b) are a diagram illustrating an embodiment of management information stored in disk identification areas 135 and 136.

FIG. 17 shows an embodiment of management information to be recorded into the disk identification areas 35 and 36. In FIG. 17(a), 144 designates a disk management identifier, 145 designates a defect list area address, 146 designates a spare area address, 147 designates a data record area address, 148 designates a defect management method identifier, and 149 designates a volume management identifier. In FIG. 17(b), 150 designates a disk management identifier, 151 designates a defect list area address, 152 designates a spare area address, 153 designates a data record area address, 154 designates a defect management method identifier, and 155 designates a volume management identifier.

The disk management identifiers 144 and 150 indicate that the respective sector is a disk management information area. The defect list area addresses 145 and 151 indicate the positions and sizes of the defect list areas 137 and 143 of the recording planes 1100 and 1101. The spare area addresses 146 and 152 indicate the positions and sizes of the spare areas 140, 141, and 142 of the recording planes 1100 and 1101. The data record area addresses 147 and 153 indicate the positions and sizes of the recording planes 1100 and 1101. The defect management method identifiers 148 and 154 indicate the defect management methods shown in FIGS. 14 to 16. The volume management identifiers 149 and 155 indicate the volume structures recorded onto the recording planes 1100 and 1101, and record the number of volumes, and allocation information of the data record areas 138 and 139 constituting the volumes.

Figure 18:
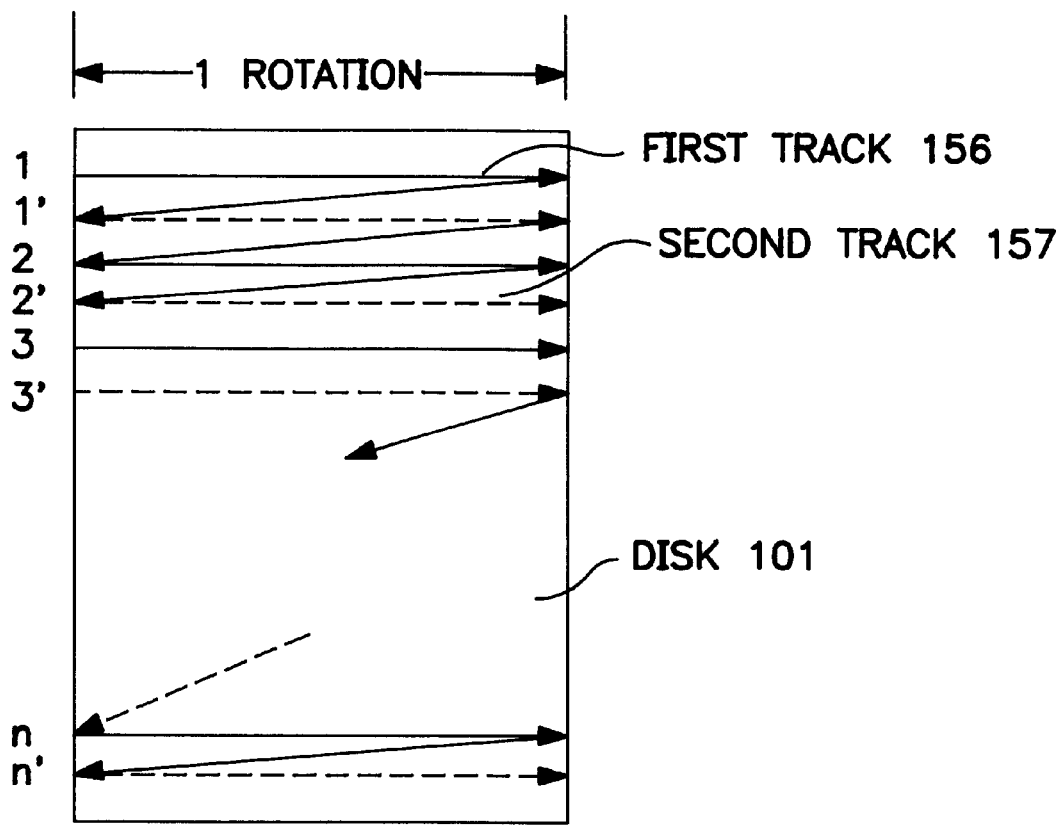
FIG. 18 is a diagram illustrating a track access of first and second tracks of a disk.
Figure 20:
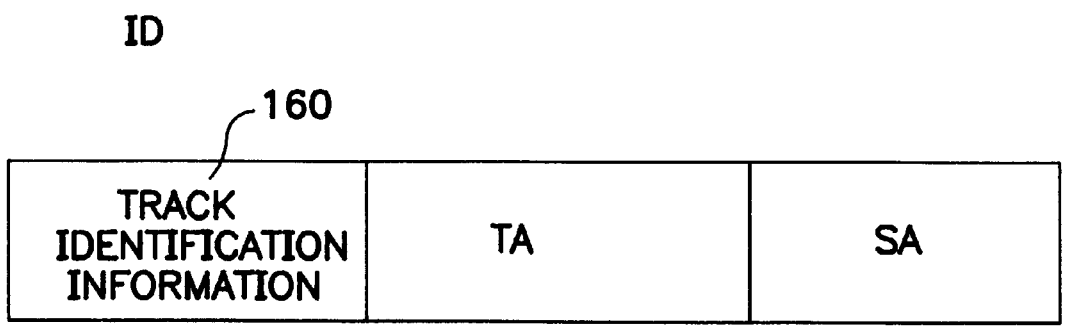
FIG. 20 is a diagram showing an example of a sector ID in which address information of a sector of a first or second track is recorded.
Figure 19:
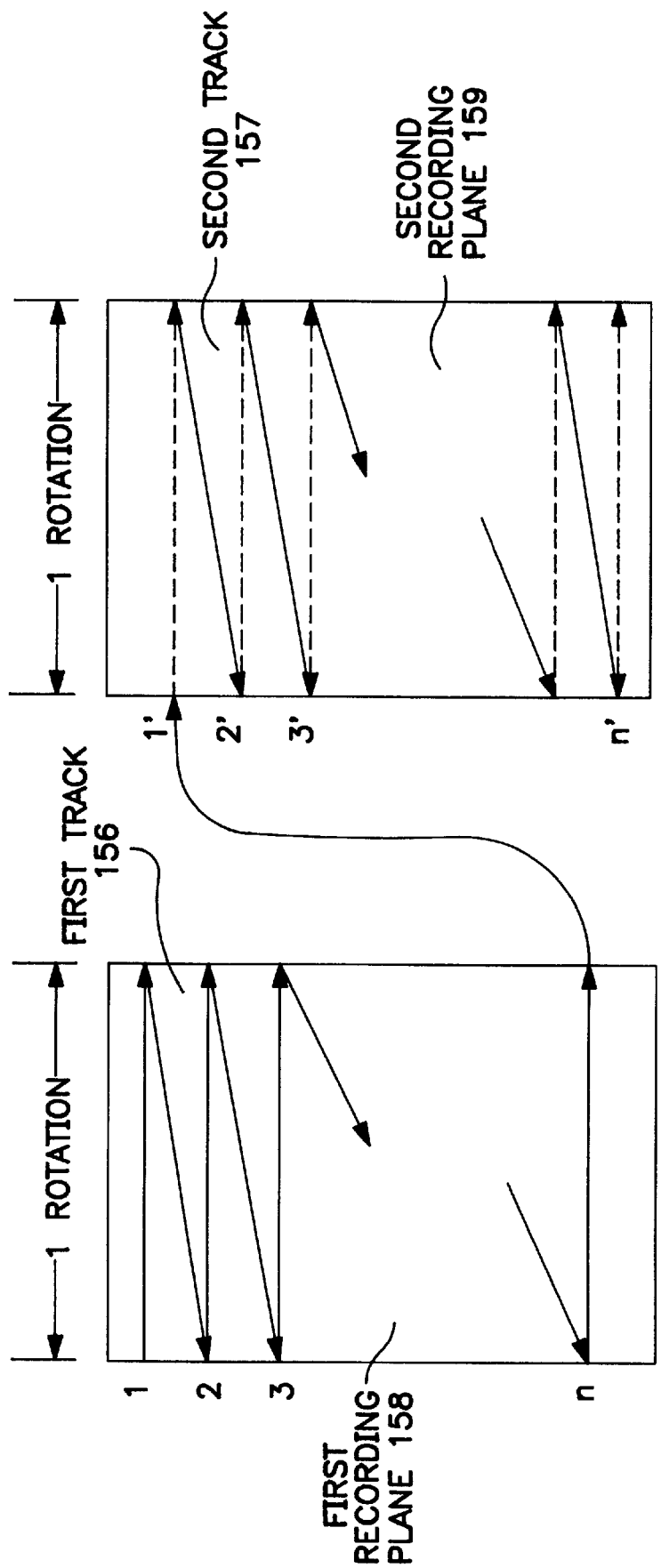
FIG. 19 is a diagram illustrating another track access of first and second tracks of a disk.

FIGS. 18 to 20 are track access diagram showing an embodiment of the track addressing which is conducted in the disk 101 wherein the first and second tracks are spiral tracks.

In the figures, 156 designates the first track, 157 designates the second track, 158 designates the recording plane of the first track 156, and 159 designates the recording plane of the second track.

In FIG. 18, the track to be accessed is switched such as the first track, and the second track at each rotation of the disk so that tracks are accessed in the sequence of tracks 1→1'→2→2'→3→ . . . In the optical disk 101, the first and second tracks can be accessed as one volume, and the first and second tracks 156 and 157 are spiral tracks. When data of a large volume are to be recorded, therefore, it is not required to search tracks, so that the data recording or reproduction can rapidly be conducted only by switching the polarity of the tracking signal.

FIG. 19 is a diagram showing a track access in which the first and second tracks 156 and 157 are sequentially accessed. The data recording or reproduction is conducted while tracks 1→2→3→ . . . →n are accessed in the first track 156 of the recording plane 158, and tracks 1'→2'→3'→ . . . →n' are accessed in the first track 157 of the recording plane 159. This attains the effects that, when a prolonged time is required for switching the tracking of the first and second tracks, an average access time can be shortened, and that the time to wait the rotation of the disk to the target sector which is caused by the track change between first and second tracks is eliminated.

FIG. 20 shows an embodiment of the sector ID in which address information of sectors of the first and second tracks is recorded. In the figure, TA designates a track address, SA designates a sector address, and 160 designates track identification information indicative of first and second tracks which are newly added to the most significant track addresses. The track identification information 160 is the track identification signal g which is the most significant bit of the track and indicates whether the track is the first track or the second track.

Referring now to FIG. 14, the operation of the optical disk recording/reproduction apparatus which records and/or reproduces information onto the thus configured optical disk will be described.

Hereinafter, the initialization operation of the information recording/reproduction apparatus will be described.

The host computer 116 outputs the read command to the SCSI bus x in order to read out the disk management areas 35 and 36. The CPU 118 receives the command through the IF 117 to interpret it, and outputs the track selection signal p, for example, the groove track selection for selecting the first track, to the track selection circuit 120 in order that the disk management information area 35 is accessed. In response to the track designation signal p, the multiplexer 122 supplies the tracking error signal c to the focus tracking circuit 123 so that the tracking is conducted on the first track. The linear motor driving circuit 110 then drives the linear motor 105 so that the optical head seeks the initial track of the disk management area 35.

The CPU 118 sets a read sector address into the register 124 of the read/write gate generator 112, and the read command in the register 126. In the read/write gate generator 112, the comparator circuit 125 compares the read sector address of the register 124 with the address output f of the ID reproduction circuit 111, and the track designation signal p with the track identification signal g. The gate generator 127 decodes the coincidence output and the output of the register 126, and supplies the read gate signal j to the data modem circuit 113. The data modem circuit 113 is actuated by the read gate j, demodulates the reproduced signal e of the disk management area 35, and sends the demodulated data n including the disk management information and the defect list information to the memory 115 so that the data are stored in the memory. The demodulated data n stored in the memory 115 are subjected to the error detection and correction in the error correction circuit 114, and then stored in the memory 115. The CPU 118 reads out the reproduced data which have undergone the error correction, and writes the data into the memory 119.

Furthermore, the CPU 118 sets the track selection signal p to the land track selection, and writes the disk management information 2 of the disk management area 36 of the second track, into the memory 119.

As a result, the CPU 118 knows the volume management method, the defect management method, the defect list areas, the spare areas, the data record areas, defect list information of the optical disk 101, and executes the data recording and reproduction described below.

Next, the data record and verify operations conducted on the data record areas 138 of the optical disk of FIG. 14 will be described.

The host computer 116 outputs the write command to the SCSI bus x. The CPU 118 receives the command through the IF 117 to interpret it, and checks whether the subject sector is a defective sector or not, from the defect list information stored in the memory 119. If the sector is not a defective sector, the track selection signal is set to the first or second track depending on the sector. If the sector is a defective sector, the track selection circuit 120 is set so as to select the second track having the spare area 140. In response to the track designation signal p, the tracking error signal c or an inverted tracking signal c' is supplied to the focus tracking circuit 123 so that the tracking is conducted on the first track or the second track. The linear motor driving circuit 110 drives the linear motor 105, thereby moving the optical head 104 to the target track.

Data to be recorded which are supplied from the host computer 116 are once stored in the memory 115, and then converted by the error correction circuit 114 to the coded data k wherein an error correction code is added to the data to be recorded.

Depending on the defect list information, the CPU 118 sets a record sector address into the register 124 of the read/write gate generator 112, and the write command into the register 126. The read/write gate generator 112 compares the record sector address of the register 124 with the address output f of the ID reproduction circuit 111. At the same time, the comparator circuit 125 compares the track designation signal p from the track designation circuit 120 with the track identification signal g of the ID reproduction circuit 111. In response to the coincidence output of the comparator circuit 125, and the write/read command of the register 126, the gate generator 127 supplies the write gate signal i to the data modem circuit 113. The data modem circuit 113 is actuated by the write gate signal i, modulates the coded data k with the (2-7) RLLC, and supplies the modulated signal m to the laser driving circuit 109. The optical head 104 records the modulated signal m into the target sector of the recording plane 103. The above data record operation is repeated in the given number of sectors.

When the data recording is completed, the CPU 118 reads out the record sectors in sequence, and checks the number of errors of the demodulated data. If the number of detected errors exceeds a predetermined criterion, the sector is alternatively recorded into the spare area 140. More specifically, the host computer 116 sends out the read command for a record sector, and the CPU 118 causes the optical head 104 to be moved to a recorded track in the same manner as the above-mentioned data recording. The CPU 118 sets a read sector address into the register 124 of the read/write gate generator 112, and the read command into the register 126. In the read/write gate generator 112, the comparator circuit 125 compares the read sector address of the register 124 with the address output f of the ID reproduction circuit 111, and the track designation signal p with the track identification signal g. The gate generator 127 decodes the coincidence output and the output of the register 126, and supplies the read gate signal j to the data modem circuit 113. The data modem circuit 113 is actuated by the read gate j, demodulates the reproduced signal e of the recording plane 103 which is supplied from the optical head 104, and sends the demodulated data n to the memory 115 so that the data are stored in the memory. The demodulated data n stored in the memory 115 are subjected to the error detection and correction in the error correction circuit 114. The error number detection circuit 128 counts the number of detected errors for each sector. The CPU 118 monitors the error number of the error number detection circuit 128 to check whether the number exceeds the criterion number or not. A sector in which the error number exceeds the criterion is judged as a defective sector and alternated in the spare area 140.

In order to alternatively record data of the defective sector into the spare area 140, the write command is issued. The CPU 118 outputs the track designation signal p for selecting the second track, to the track selection circuit 120. The multiplexer 122 supplies the inverted tracking error signal c' to the focus tracking circuit 123 so that the tracking is conducted on the second track. Then, data are recorded into the spare area in the same manner as the data recording discussed above. The addresses of the defective sector and the alternate sector for it are recorded as one list set into the defect list area 137.

With respect to a spare sector and a defect list sector, the defective sector alternation is conducted as required in the same manner as described above.

In the case where the spare areas are respectively formed in the first and second tracks as shown in FIG. 15, a detected defective sector is alternated in the spare area 141 or 142 of the track to which this defective sector belongs. In the case where the defect list areas 137 and 143 are respectively formed in the first and second tracks as shown in FIG. 16, the address list for sectors used in the defect alternation process is recorded into the defect list area to which the defective sector belongs. The above-mentioned data recording, and the alternation process of a defective sector are conducted depending on the contents of the volume management identifiers 149 and 155, and the defect management method identifiers 148 and 154.

Referring now to FIG. 14, the data recording conducted on the data record area 138 will be described.

When the host computer 116 outputs the read command, the CPU 118 interprets the command, and checks whether the subject sector is a defective sector or not, from the defect list stored in the working area 119c of the memory 119. If the sector is a defective sector, the track selection circuit 120 is set so as to select the second track having the spare area 140. In response to the track designation signal p, the tracking error signal tracking inverted tracking signal c' is supplied to the focus tracking circuit 123 so that the tracking is conducted on the first track or the second track. The linear motor driving circuit 110 drives the linear motor 105, thereby moving the optical head 104 to the target track.

Depending on the defect list information, the CPU 118 sets a read sector address into the register 124 of the read/write gate generator 112, and the read command into the register 126. In the read/write gate generator 112, the comparator circuit 125 compares the read sector address of the register 124 with the address output f of the ID reproduction circuit 111, and the track designation signal p with the track identification signal g. The gate generator 127 decodes the coincidence output and the output of the register 126, and supplies the read gate signal j to the data modem circuit 113. The data modem circuit 113 is actuated by the read gate j, demodulates the reproduced signal e of the recording plane 103 which is supplied from the optical head 104, and sends the demodulated data n to the memory 115 so that the data are stored in the memory. The demodulated data n stored in the memory 115 are subjected to the error detection and correction in the error correction circuit 114, and again stored in the memory 115. The reproduced data which have undergone the error correction are transferred to the host computer 116 through the interface 117. The above data read operation is repeated in the given number of sectors.

In the case where the data record areas 138 and 139 or the spare areas are respectively formed in the first and second tracks as shown in FIG. 15, or the case where the defect list areas 137 and 143 are respectively formed in the first and second tracks as shown in FIG. 16, the reading is conducted while the track selection signal p is switched by the track selection circuit 120. The defect management method, and the volume management are conducted depending on the contents of the defect management method identifiers 148 and 154, and the volume identifiers 149 and 155.

As described above, according to the invention, the data recording and reproduction, and the defect alternation process can be conducted on the optical disk comprising first and second tracks which are formed on the same recording plane, so that the recording of a large data volume which is doubled as compared with that in the prior art is conducted.

The disk management areas are generated in the initialization of the disk. A method of initializing the disk of FIG. 16 will be described.

While tracking the first track 130 with the light spot in accordance with the track selection signal p, a test signal is recorded, and then read out to be verified, thereby detecting a defective sector. Then, the polarity of the track selection signal p is inverted, and a defective sector of the second track 131 is detected. Depending on the capacity of the optical disk 101 and the quality data, the CPU 118 secures the sizes of the defect list areas 137 and 143 required for the number of alternations of defective sectors, and records the addresses and sizes of the areas, the addresses and sizes of the spare areas 141 and 142, and the addresses and sizes of the data record areas 138 and 139. In the defect list areas 137, recorded are alternation lists of defective sectors of the recording plane 1100 of the first track 130 and the recording plane 1101 of the second track 131. The defect management method information 148 and 154, and the volume identification information 149 and 155 are recorded into the disk management information areas 35 and 36 in response to instructions from the host computer 116.

It is a matter of course that the above-described embodiments of the optical disk can be adequately combined.

As apparent from the above description, according to the invention, data recording and reproduction can be conducted on an optical disk comprising first and second tracks which are formed on the same recording plane, and the defect alternation process can rapidly be conducted thereon, whereby the capacity can greatly be improved as compared with the prior art.

What is claimed is:

1. An optical disk comprising a recording plane having a spiral first track and a spiral second track, information being recorded into and/or reproduced from said first and second tracks, wherein said first track is formed into a groove-like shape, said second track is formed between adjacent said first tracks and into a land-like shape, and said first and second tracks both record said information using different modulation methods.

2. An optical disk comprising a recording plane having a spiral first track and a spiral second track, information being recorded into and/or reproduced from said first and second tracks, wherein said first track is formed into a groove-like shape, said second track is formed between adjacent said first tracks and into a land-like shape, and said first and second tracks both record at least an address signal among said information using different modulation methods.

3. An optical disk comprising a recording plane having a spiral first track and a spiral second track, information being recorded into and/or reproduced from said first and second tracks, wherein said first track is formed into a groove-like shape, said second track is formed between adjacent said first tracks and into a land-like shape, and said first and second tracks both record an address signal for identifying a respective track in such a manner that address signals of adjacent ones of said first and second tracks do not overlap with each other in a radial direction.

4. An optical disk according to any one of claims 1, 2 or 3, wherein said first track has a depth of $\lambda/(8 \cdot n)$ where $\lambda$ is a wavelength of a laser beam, and n is a refractive index of a substrate of said disk.

5. An optical disk according to any one of claims 1, 2 or 3, wherein said first and second tracks are divided into sectors each of which constitutes a unit of recording or reproducing information, a track address and a sector address is recorded in the address signal, and information is recorded into and/or reproduced from said sectors in a unit of the sector.

6. An optical disk according to claim 5, wherein the address signals of said first and second tracks record a track identification signal for identifying the respective track, address information, and an error detection signal.

7. An optical disk according to claim 5, wherein the address signals of said first and second tracks are constituted by a mark position recording method, the address signal of said first track is recorded in such a manner that a modulated channel bit "1" corresponds to a level of the land and a channel bit "0" corresponds to a level of the groove, and the address signal of said second track is recorded in such manner that a modulated channel bit "1" corresponds to a level of the groove and a channel bit "0" corresponds to a level of the land.

8. An information reproduction method by which information is reproduced from an optical disk comprising first and second tracks which are formed on the same recording plane, wherein, when said first track is to be accessed, a defect list is read out from a first defect list area of said first track, and a defective sector is reproduced in accordance with contents of said defect list by reproducting an alternate sector of a first spare area of said first track, and, when said second track is to be accessed, a defect list is read out from a second defect list area of said second track, and a defective sector is reproduced in accordance with contents of said defect list by reproducing an alternate sector of a second spare area of said second track.

9. An information reproduction method by which information is reproduced from an optical disk comprising first and second tracks which are formed on the same recording plane, wherein, when said first track is to be accessed, a defect list is read out from a defect list area of said first track, and a defective sector is reproduced in accordance with contents of said defect list by reproducing an alternate sector of a first spare area of said first track, and, when said second track is to be accessed, a defect list is read out from said defect list area of said first track, and a defective sector is reproduced in accordance with contents of said defect list by reproducing an alternate sector of a second spare area of said second track.

10. An information reproduction method by which information is reproduced from an optical disk comprising first and second tracks which are formed on the same recording plane, wherein, when said first track is to be accessed, a defect list is read out from a first defect list area of said first track, and a defective sector is reproduced in accordance with contents of said defect list by reproducing an alternate sector of a first spare area of said first track, and when said second track is to be accessed, a defect list is read out from a second defect list area of said second track, and a defective sector is reproduced in accordance with contents of said defect list by reproducing an alternate sector of a second spare area of said second track, wherein said first track is a track in which information is recorded into a groove, said second track is a track in which information is recorded onto a land sandwiched by said first track, and the switching of said first and second tracks is conducted by inverting a polarity of a tracking error signal.

11. An optical disk according to claim 2, wherein said information is recorded and/or reproduced from both said first and second tracks.

12. An optical disk according to claim 3, wherein said information is recorded and/or reproduced from both said first and second tracks.

* * * * *

UNITED STATES PATENT AND TRADE MARK OFFICE
CERTIFICATE OF CORRECTION

PATENT NO. : 5,920,540
DATED : July 6, 1999
INVENTOR(S) : Satoh

It is certified that error appears in the above-identified patent and that said Letters Patent is hereby corrected as shown below:

Column 23, line 1, "reproducting" should be --reproducing--.

Signed and Sealed this

Second Day of May, 2000

Attest:

Q. TODD DICKINSON

*Attesting Officer*  *Director of Patents and Trademarks*